US007011337B2

(12) United States Patent
Aoki et al.

(10) Patent No.: US 7,011,337 B2
(45) Date of Patent: Mar. 14, 2006

(54) OCCUPANT RESTRAINT SYSTEM

(75) Inventors: Takashi Aoki, Saitama (JP); Fumiharu Ochiai, Saitama (JP); Hidetoshi Utsumi, Wako (JP); Naohiko Saita, Saitama (JP); Yuichi Saito, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/167,234

(22) Filed: Jun. 11, 2002

(65) Prior Publication Data

US 2003/0006590 A1 Jan. 9, 2003

(30) Foreign Application Priority Data

Jun. 11, 2001 (JP) ............................. 2001-175066
Jun. 11, 2001 (JP) ............................. 2001-175067
Jun. 11, 2001 (JP) ............................. 2001-176054

(51) Int. Cl.
*B60R 21/22* (2006.01)
*B60R 21/24* (2006.01)

(52) U.S. Cl. ................................. 280/730.2; 280/728.2
(58) Field of Classification Search ............. 280/728.2, 280/730.2, 730.1
See application file for complete search history.

(56) References Cited

U.S. PATENT DOCUMENTS

| 5,899,486 | A | * | 5/1999 | Ibe | ............................ | 280/728.2 |
| 6,135,493 | A | | 10/2000 | Jost et al. | | |
| 6,142,506 | A | * | 11/2000 | Patel et al. | ............... | 280/728.2 |
| 6,170,861 | B1 | | 1/2001 | Tietze | | |
| 6,234,517 | B1 | * | 5/2001 | Miyahara et al. | ......... | 280/730.2 |
| 6,254,123 | B1 | * | 7/2001 | Urushi et al. | ............. | 280/730.2 |
| 6,260,878 | B1 | * | 7/2001 | Tanase | ..................... | 280/730.2 |
| 6,267,407 | B1 | * | 7/2001 | Zychowicz et al. | ....... | 280/728.2 |
| 6,293,581 | B1 | * | 9/2001 | Saita et al. | .............. | 280/730.2 |
| 6,305,707 | B1 | * | 10/2001 | Ishiyama et al. | ......... | 280/728.2 |
| 6,340,171 | B1 | * | 1/2002 | Hirth et al. | .............. | 280/730.2 |
| 6,412,810 | B1 | * | 7/2002 | Wipasuramonton et al. | ........................ | 280/730.2 |
| 6,485,048 | B1 | * | 11/2002 | Tajima et al. | ............. | 280/728.2 |
| 6,793,240 | B1 | * | 9/2004 | Daines et al. | ................ | 280/729 |

FOREIGN PATENT DOCUMENTS

| DE | 198 38 641 A 1 | 3/1999 |
| DE | 198 12 737 A 1 | 5/1999 |
| DE | 10010211 A1 | 2/2001 |
| EP | 0 980 795 A2 | 2/2000 |
| JP | 46-23533 | 8/1971 |
| JP | 10-029482 | 2/1998 |
| JP | 10-138861 | 5/1998 |
| JP | 10-181512 | 7/1998 |

(Continued)

*Primary Examiner*—Son T. Nguyen
(74) *Attorney, Agent, or Firm*—Carrier, Blackman & Associates, P.C.; Joseph P. Carrier; William D. Blackman

(57) ABSTRACT

An occupant restraint system includes an airbag and an inflator. A gas supply pipe extending from the inflator is inserted into the interior of the airbag and immovably fixed in a manner in which the gas supply pipe is clamped from above and below by a pipe support formed in the airbag from a part of stitching defining a plurality of cells. The gas supply pipe can thus be fixed without employing any special fixing member, thereby reliably preventing blockage of the gas nozzle that would cause interference with smooth issuing of the gas and preventing damage to a base fabric of the airbag by the heat and pressure of the gas.

8 Claims, 22 Drawing Sheets

FOREIGN PATENT DOCUMENTS

| | | |
|---|---|---|
| JP | 10-329634 | 12/1998 |
| JP | 11-235965 | 8/1999 |
| JP | 2000-033847 | 2/2000 |
| JP | 2000-085514 | 3/2000 |
| JP | 2000071928 A * | 3/2000 |
| JP | 2000-127886 | 5/2000 |
| JP | 2000-142289 | 5/2000 |
| JP | 2001219807 A * | 8/2001 |
| JP | 2001322525 A * | 11/2001 |
| JP | 2002316611 A * | 10/2002 |

* cited by examiner

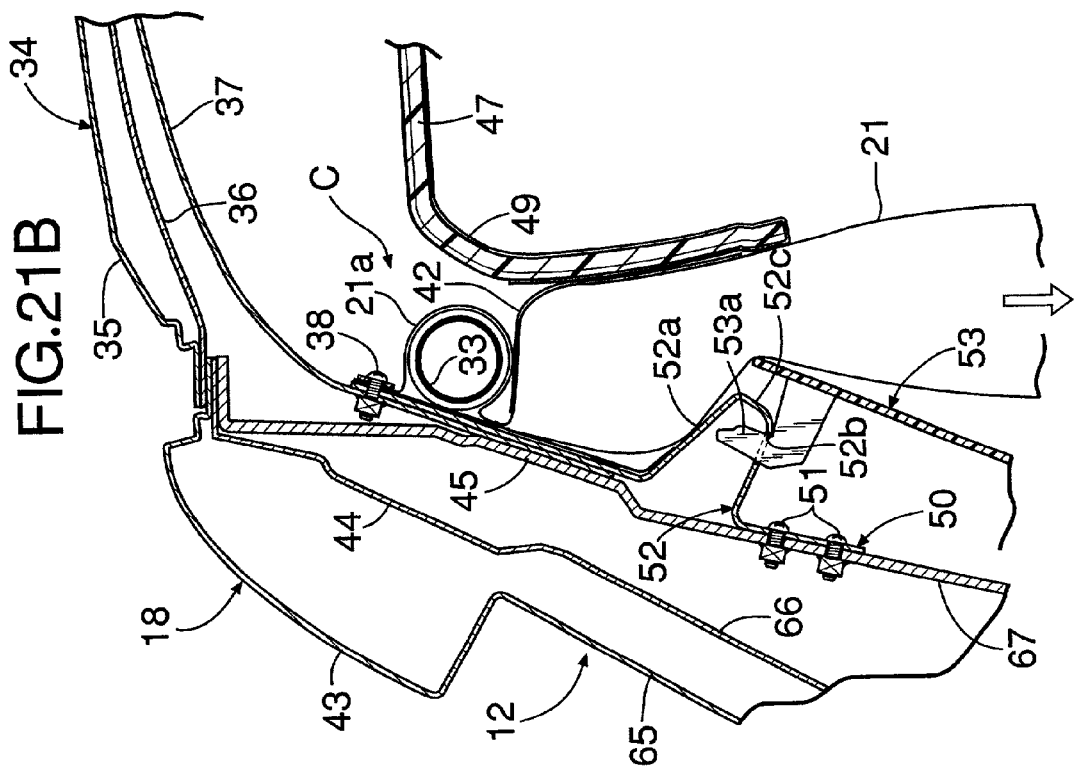
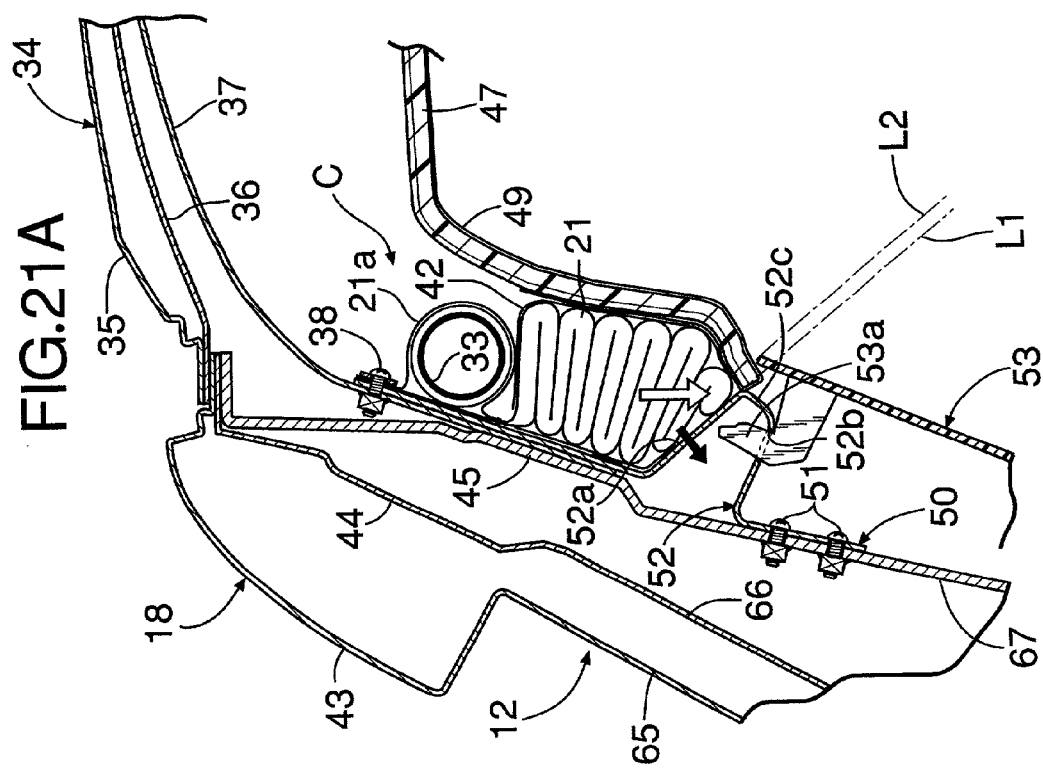

OCCUPANT RESTRAINT SYSTEM

BACKGROUND OF THE INVENTION

1. Field of the Invention

The present invention relates to an occupant restraint system in which a side airbag is disposed in a folded state along an upper edge of a door opening of a vehicle body, and the airbag is inflatable by a gas, generated by an inflator, when the vehicle is involved in a collision. Upon inflation, the side airbag is deployed into a curtain shape along the inner face of a side of an occupant compartment.

2. Description of the Related Art

A conventional occupant restraint system is known in, for example, Japanese Patent Application Laid-open Nos. 2000-33847 and 11-235965. These Japanese Patent Application Laid-open Nos. 2000-33847 and 11-235965 disclose an arrangement in which a gas generated by an inflator is guided into the interior of an airbag via a gas supply pipe such as a hose, a duct, or a reinforcement liner tube.

In this conventional arrangement, since the gas supply pipe in the vicinity of the gas nozzle is not fixed relative to the airbag, there is a possibility that the gas nozzle might be blocked by a base fabric of the airbag, thereby preventing the gas from issuing smoothly or damaging the base fabric by the heat and pressure of the gas. Fixing the gas supply pipe in the vicinity of the gas nozzle at an appropriate position within the airbag has therefore been considered, but this requires a special fixing member, thereby causing the problems of an increase in the number of parts and an increase in the number of processing steps.

An arrangement is also known in which an impact absorbing member is provided in the vicinity of a roof side rail where a folded airbag is housed, and the impact absorbing member can be made to collapse by an external load so that it can absorb the impact of a secondary collision to an occupant in the case of a light collision where the airbag does not deploy.

When the folded airbag is mounted in the roof side rail after the impact absorbing member has been mounted in the roof side rail or a roof garnish, both an operation to mount the impact absorbing member and an operation to mount the airbag are required, and there are the problems not only of a deterioration in the manufacturing efficiency, but also of the airbag interfering with the impact absorbing member, thereby degrading the manufacturability. Furthermore, since the conventional impact absorbing member does not have flexibility, in order to mount it along a curved roof side rail it is necessary to divide it into a plurality of sections, and this causes the problem of a further deterioration in the manufacturing efficiency.

As shown in FIG. 22, which corresponds to a cross section along line 6—6 of FIG. 1, in a conventional occupant restraint system, when an airbag 103 is not deployed, it is folded in a space between a roof garnish 101 and an inner member 102 forming a vehicle body, the roof garnish 101 being the innermost layer on the occupant compartment side. The airbag 103, together with a cover 104 covering the airbag 103, is secured by a bolt 105 to the inner member 102. Furthermore, provided beneath the airbag 103 is a guide member 106, which is substantially aligned with a parting line L5 that is a border between the roof garnish 101 and a center pillar garnish 107. This guide member 106 is provided so as to guide the direction in which the airbag 103 deploys toward the parting line L5.

That is, when a gas is supplied to the airbag 103 from an inflator (not illustrated), the airbag 103 starts to inflate, ruptures the cover 104, deploys following the shape of the guide member 106, abuts against an extremity 101a of the roof garnish 101 in the vicinity of the parting line L5, and pushes the roof garnish 101 to the inside of the occupant compartment. As a result, an opening is formed between the center pillar garnish 107 and the roof garnish 101, and the airbag 103 deploys through this opening into the occupant compartment.

However, arranging the occupant restraint system in this way might expose the guide member 106 to a force generated accompanying sudden inflation of the airbag 103 and deform the guide member. The guide member 106 might also be deformed when the vehicle itself is deformed by a collision. Deformation of the guide member 106 might cause a large discrepancy between the position of the parting line L5 and the direction in which the airbag 103 inflates, and there is a possibility that the time taken to form an opening by pushing the roof garnish might vary. Such a variation causes an undesirable variation in the deployment characteristics such as the time to completion of deployment of the airbag 103.

In order to suppress such a variation, if the guide member 106 is formed integrally with the inner member 102, and/or if the rigidity of the guide member 106 is increased, the problems of the production process become complicated, and the vehicle weight increases.

The present invention has been achieved in view of the above-mentioned circumstances, and it is a first object of the present invention to fix the relative position of a gas supply pipe, that is inserted within an airbag, without the need for any special fixing member.

A second object of the present invention is to improve the ease of mounting an airbag and an impact absorbing member.

A third object of the present invention is to make consistently stable the deployment characteristics of an airbag by devising the arrangement of the structure of an occupant restraint system.

SUMMARY OF THE INVENTION

In order to accomplish the first object, a first aspect of the present invention proposes an occupant restraint system in which an airbag is disposed in a folded state along an upper edge of a door opening of a vehicle body. The airbag is adapted to be inflated by a gas generated by an inflator, when the vehicle is involved in a collision, so that the airbag is deployed into a curtain shape along the inner face of a side of an occupant compartment. According to the first aspect of the invention, the airbag includes a pipe support formed from a part of stitching defining a plurality of cells, and a gas supply pipe, extending from the inflator into the interior of the airbag, is supported by the pipe support.

In accordance with this arrangement, since the gas supply pipe, extending from the inflator into the interior of the airbag, is supported by the pipe support formed in the airbag from part of the stitching defining the plurality of cells, the gas supply pipe can be fixed without employing any special fixing member, thereby reliably preventing any interference with smooth issuing of the gas and damage to a base fabric by the heat and pressure of the gas.

Furthermore, in order to accomplish the second object, a second aspect of the present invention proposes an occupant restraint system in which an airbag is disposed in a folded state along an upper edge of a door opening of a vehicle body and the airbag is adapted to be inflated by a gas, generated by an inflator, when the vehicle is involved in a collision, so that it is deployed into a curtain shape along the inner face of a side of an occupant compartment. According to the second aspect of the invention, the folded airbag and an impact absorbing member are integrated into an assembly and fixed to the vehicle body so that the impact absorbing member is in contact with a metal panel.

In accordance with this arrangement, since the folded airbag and the impact absorbing member are integrated and fixed to the vehicle body, the ease of mounting is outstandingly enhanced in comparison with a case where they are mounted on the vehicle body individually. Moreover, since they are fixed to the vehicle body so that the impact absorbing member is in contact with the metal panel, the impact absorbing member can be reliably made to collapse by the load of a secondary collision, thereby increasing the impact-absorbing effect thereof.

The metal panel of the present invention corresponds to inner members 37 and 41 of the depicted embodiments.

Furthermore, in order to accomplish the second object, a third aspect of the present invention proposes an occupant restraint system in which an airbag is disposed in a folded state along an upper edge of a door opening of a vehicle body, and the airbag is adapted to be inflated by a gas generated by an inflator when the vehicle is involved in a collision, so that it is deployed into a curtain shape along the inner face of a side of an occupant compartment. In the third aspect of the invention, the folded airbag and a flexible impact absorbing member are integrated and fixed to the vehicle body.

In accordance with this arrangement, since the folded airbag and the flexible impact absorbing member are integrated and fixed to the vehicle body, the ease of mounting is outstandingly enhanced in comparison with a case where they are mounted in a vehicle body individually and, moreover, since the impact absorbing member has flexibility, it can easily be bent along the shape of the vehicle body.

Moreover, in order to accomplish the second object, in accordance with a fourth aspect of the present invention, in addition to the third aspect, there is proposed an occupant restraint system wherein the impact absorbing member is formed from a corrugated pipe.

In accordance with this arrangement, since the impact absorbing member is formed from the corrugated pipe, both a necessary flexibility and an impact-absorbing effect can be imparted thereto.

Furthermore, in order to accomplish the third object, a fifth aspect of the present invention proposes an occupant restraint system in which an airbag deploys by opening a border between a roof garnish and a pillar garnish, the roof garnish being the innermost layer on the occupant compartment side of a vehicle roof, and the pillar garnish being the innermost layer on the occupant compartment side of a pillar, wherein the system includes a bracket for positioning and fixing the airbag, and the bracket includes a projection that projects toward the roof garnish and/or the pillar garnish in order to control the direction in which the airbag deploys when it is inflated, and the projection can be deformed and displaced from an upper position where a line extending from the upper face of the projection being above the border, to a lower position where the line is substantially aligned with the border.

In accordance with this arrangement, since the projection so provided deforms downward when the occupant restraint system operates so as to control the direction in which the airbag deploys, the deployment characteristics of the airbag can be stabilized and an occupant can reliably be protected.

Moreover, in order to accomplish the third object, in accordance with a sixth aspect of the present invention, in addition to the fifth aspect, there is proposed an occupant restraint system wherein the system includes connecting means that extends from the pillar garnish and provides a connection between the projection and the pillar garnish in order to restrict movement of the pillar garnish.

In accordance with this arrangement, the connecting means so provided stabilizes the position of the border relative to the position of the airbag, thereby further stabilizing the deployment characteristics of the airbag.

The connecting means of the present invention corresponds to a latch 53*a* of the depicted embodiments.

The above-mentioned objects, other objects, characteristics and advantages of the present invention will become apparent from an explanation of preferred embodiments that will be described in detail below by reference to the attached drawings.

BRIEF DESCRIPTION OF THE DRAWINGS

FIG. 1 is a perspective view showing an interior of the occupant compartment of an automobile.

FIG. 2 is a view corresponding to FIG. 1, showing a state in which an airbag of an occupant restraint system has been deployed.

FIG. 3 is an enlarged view of the occupant restraint system in which the airbag has been deployed.

FIG. 4 is an exploded perspective view of the occupant restraint system.

FIG. 5 is an enlarged cross section along line 5—5 in FIG. 1.

FIG. 6 is an enlarged cross section along line 6—6 in FIG. 1.

FIG. 7 is an enlarged cross section along line 7—7 in FIG. 1.

FIG. 8 is an enlarged cross section along line 8—8 in FIG. 1.

FIG. 9 is an enlarged cross section along line 9—9 in FIG. 3.

FIG. 10 is an enlarged cross section along line 10—10 in FIG. 5.

FIG. 11 is a view taken in a direction of arrow 11 in FIG. 4.

FIG. 12 is a view taken in a direction of arrow 12 in FIG. 7.

FIG. 13 is an enlarged view of the vicinity of a rear part of the deployed airbag.

FIG. 14 is a front view of an occupant seated in a front seat.

FIGS. 19 to 21 show a sixth embodiment of the present invention.

FIG. 19 is a view corresponding to FIG. 6.

FIG. 20 is a view corresponding to FIG. 7.

FIGS. 21A and 21B are explanatory drawings corresponding to FIG. 19.

DESCRIPTION OF THE PREFERRED EMBODIMENTS

Figure 1:
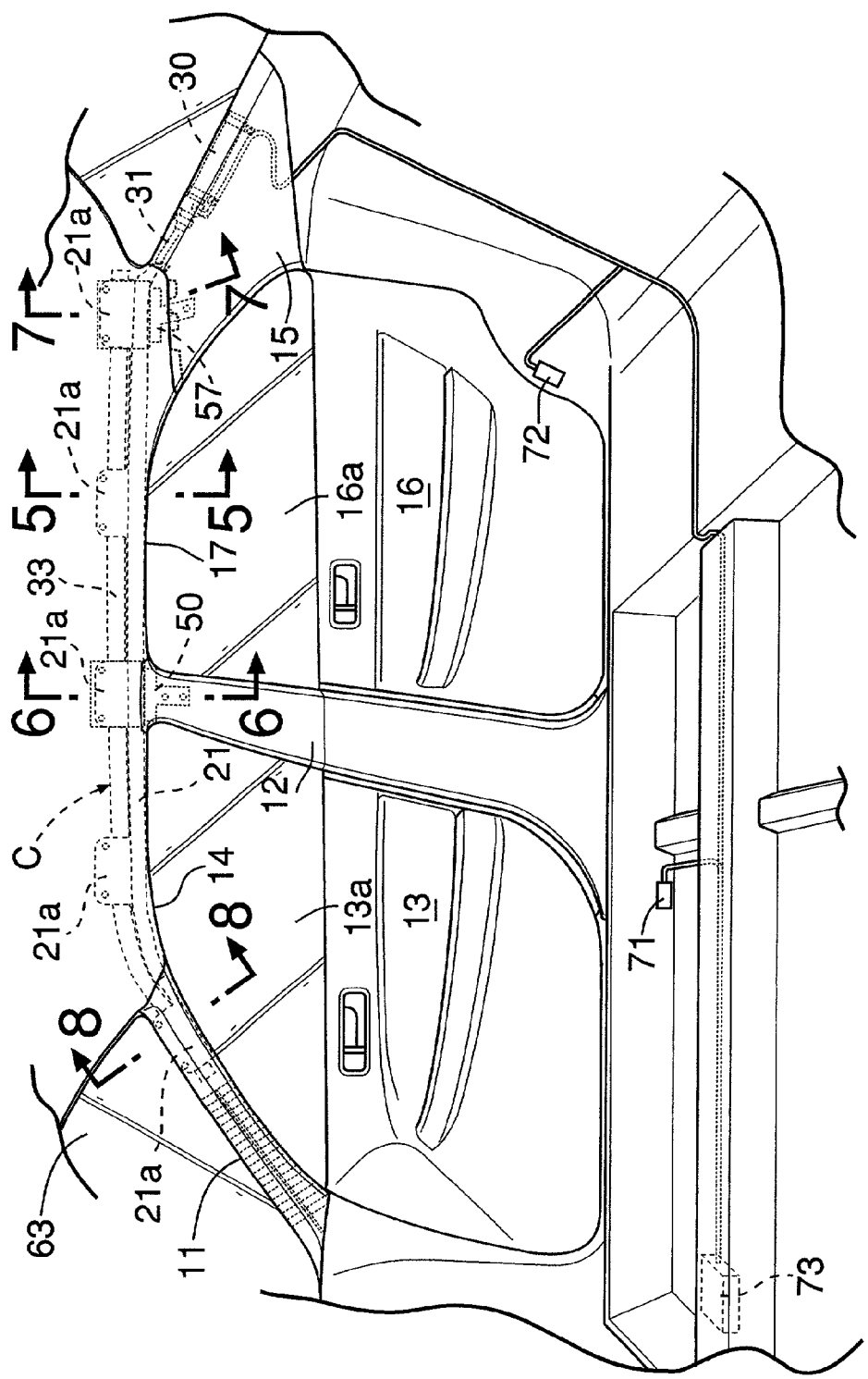
FIGS. 1 to 14 show a first embodiment of the present invention.

Referring to FIG. 1, a door opening 14 for receiving a front door 13 is formed between a front pillar 11 and a center pillar 12 on a vehicle body side face, and a door opening 17 for receiving a rear door 16 is formed between the center pillar 12 and a rear pillar 15. A roof side rail 18 (see FIG. 5) extends in the longitudinal direction of the vehicle body so as to provide a connection between the upper end of the front pillar 11 and the upper end of the rear pillar 15, the roof side rail 18 defining the upper edges of the door openings 14 and 17 of the front door 13 and the rear door 16. An occupant restraint system C is provided along the roof side rail 18. The occupant restraint system C is provided on each of the left and right sides of the vehicle body. The occupant restraint systems C on the respective left and right sides of the vehicle have a substantially identical mirror-image structure. Therefore, a description of the structure on one side of the vehicle body will suffice to explain the invention, and that provided on the right side of the vehicle body is described below as representative thereof.

Figure 2:
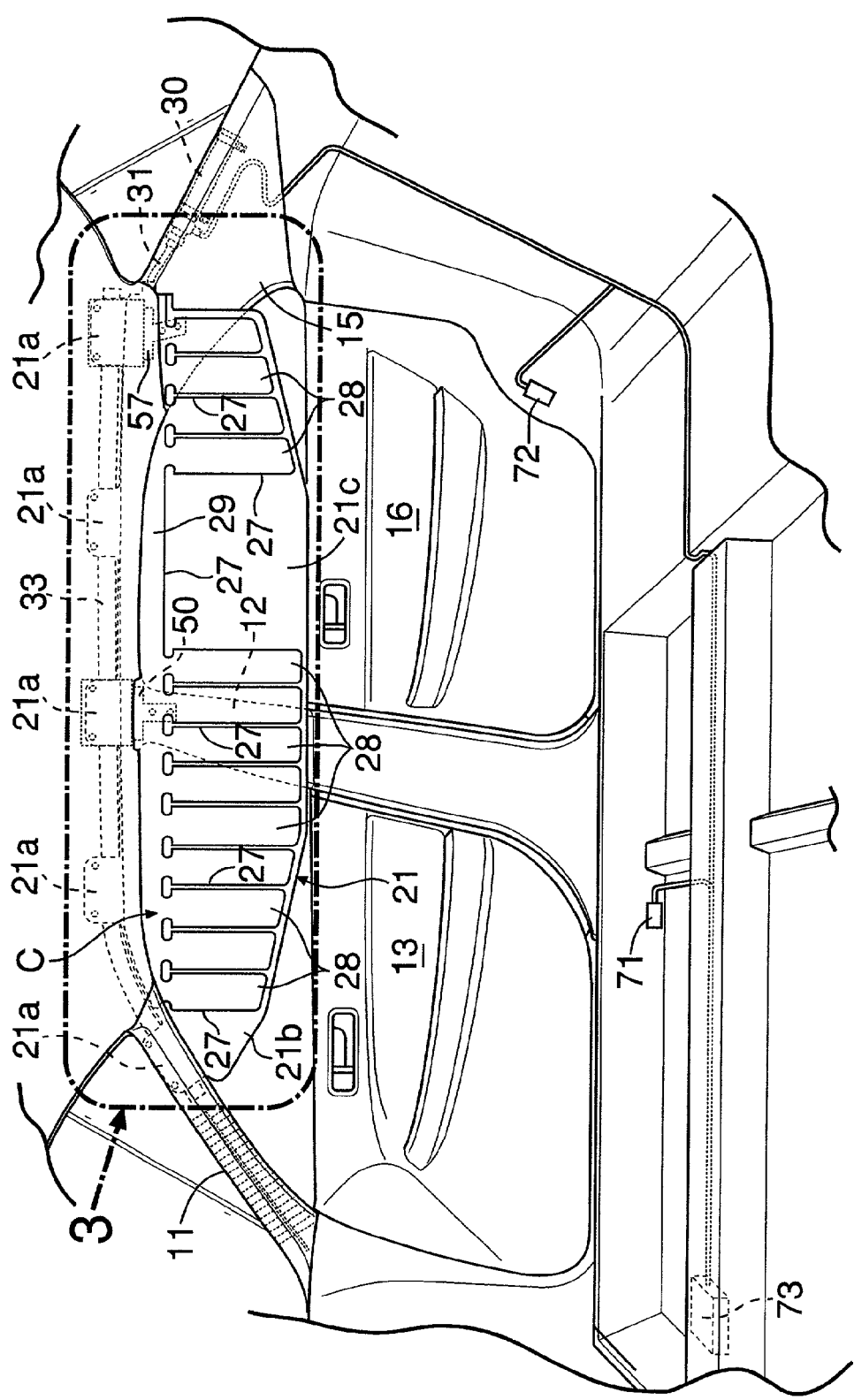

Referring to FIG. 2, when the vehicle is involved in a side collision or a rollover, if an acceleration equal to or greater than a predetermined value is detected, an airbag 21 of the occupant restraint system C is deployed downward into a curtain shape from the upper edges of the door openings 14 and 17 so as to block occupants seated in front and rear seats from impacting against the inner side face of the vehicle body, that is, the front pillar 11, the center pillar 12, the rear pillar 15, a window pane 13a of the front door 13, and a window pane 16a of the rear door 16.

Figure 3:
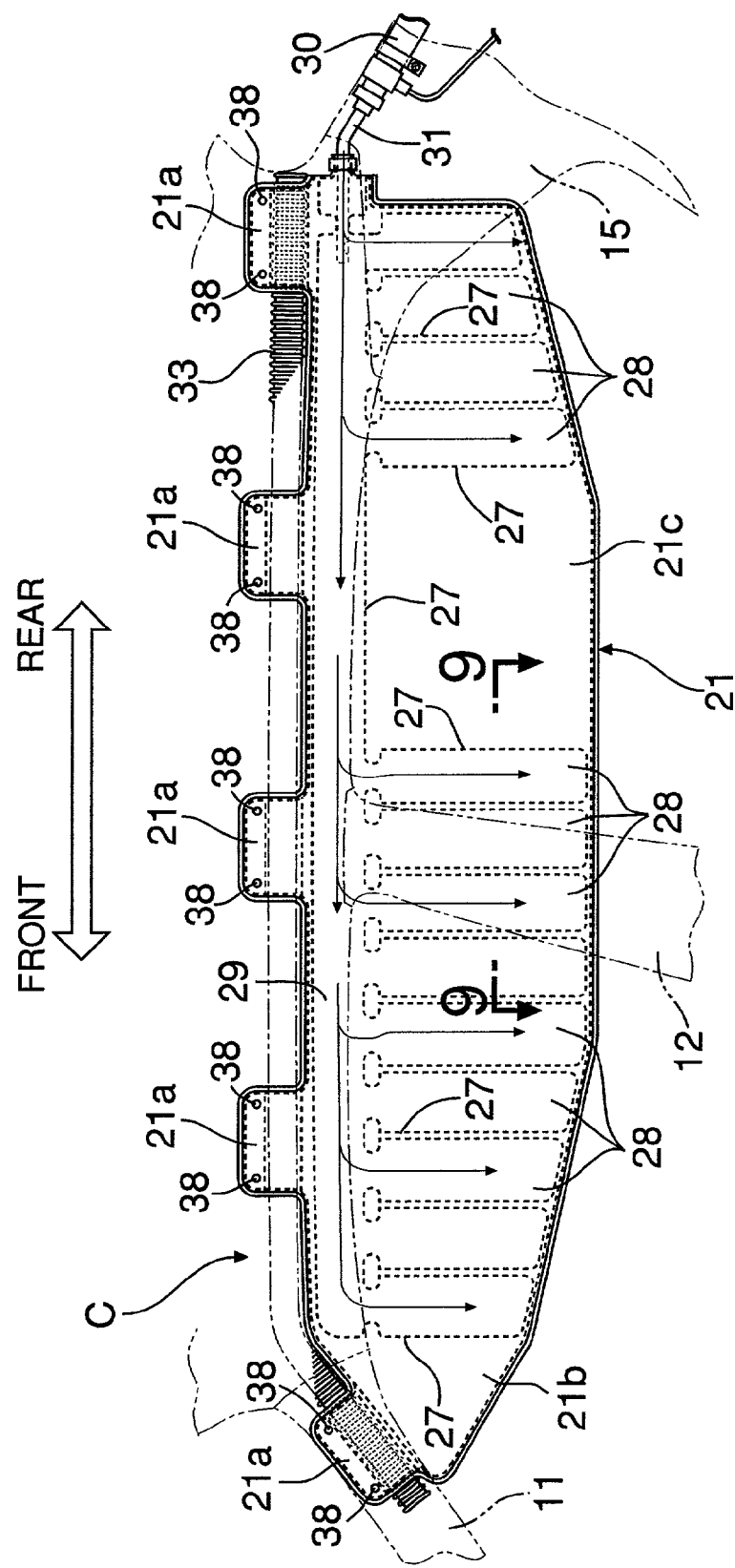
Figure 9:
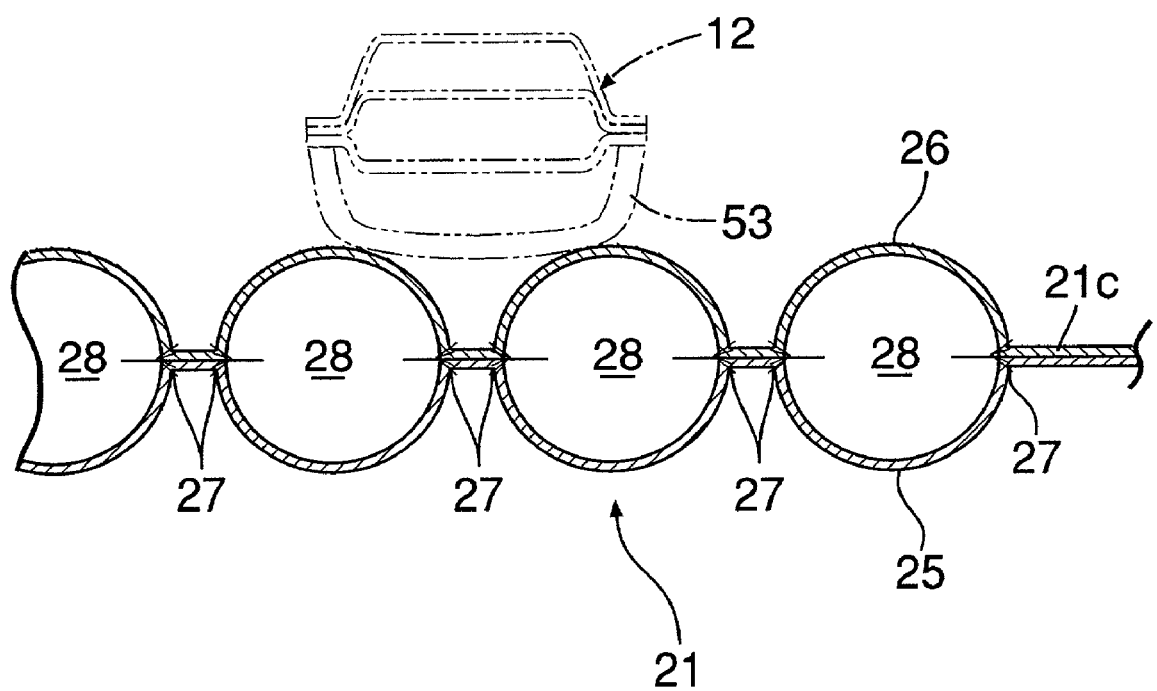

As shown in FIG. 3, the airbag 21 extending in the longitudinal direction of the vehicle body is formed by sewing with stitching 27 a first base fabric 25 and a second base fabric 26 superimposed one on top of the other, the two fabrics having substantially the same shape (see FIG. 9). The stitching 27 forms a plurality of (for example, thirteen) cells 28 and an upper communicating passage 29. The front end of a gas supply pipe 31 extending forward from an inflator 30 housed within the rear pillar 15 is inserted into the upper communicating passage 29. The lower ends of the thirteen cells 28 branching downward from the upper communicating passage 29 are closed. The portion of the gas supply pipe 31 which is inserted into the upper communicating passage 29, is tightened by means of a metal band 22 (see FIG. 13).

Positions of the airbag 21 that correspond to the rear side of the front pillar 11 and the rear side of the center pillar 12 are provided with non-inflatable sections 21b and 21c where no cells 28 are formed.

Figure 13:
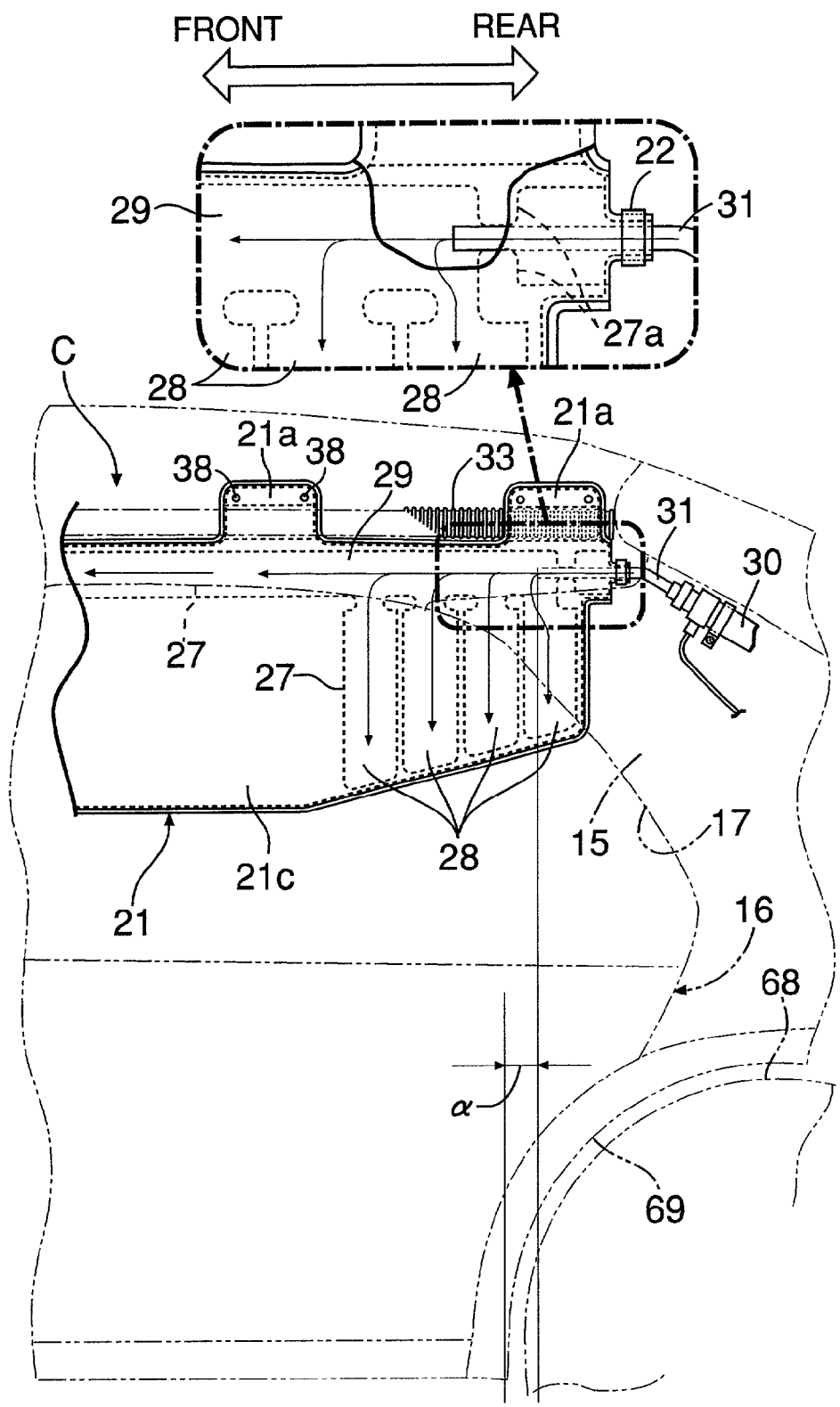

As shown in FIG. 13 in a magnified manner, since the diameter of the gas supply pipe 31 extending forward from the inflator 30 is smaller than the diameter of the upper communicating passage 29 of the airbag 21, the gas supply pipe 31 is positioned by means of pipe supports 27a formed from parts of the stitching 27 defining the upper communicating passage 29 so that the opening at the tip end of the gas supply pipe 31 is positioned at the center of the upper communicating passage 29. In this way, simply modifying parts of the stitching 27 of the airbag 21 can position the gas supply pipe 31 relative to the upper communicating passage 29, thus eliminating special parts for the positioning to contribute to a reduction in cost.

Figure 10:
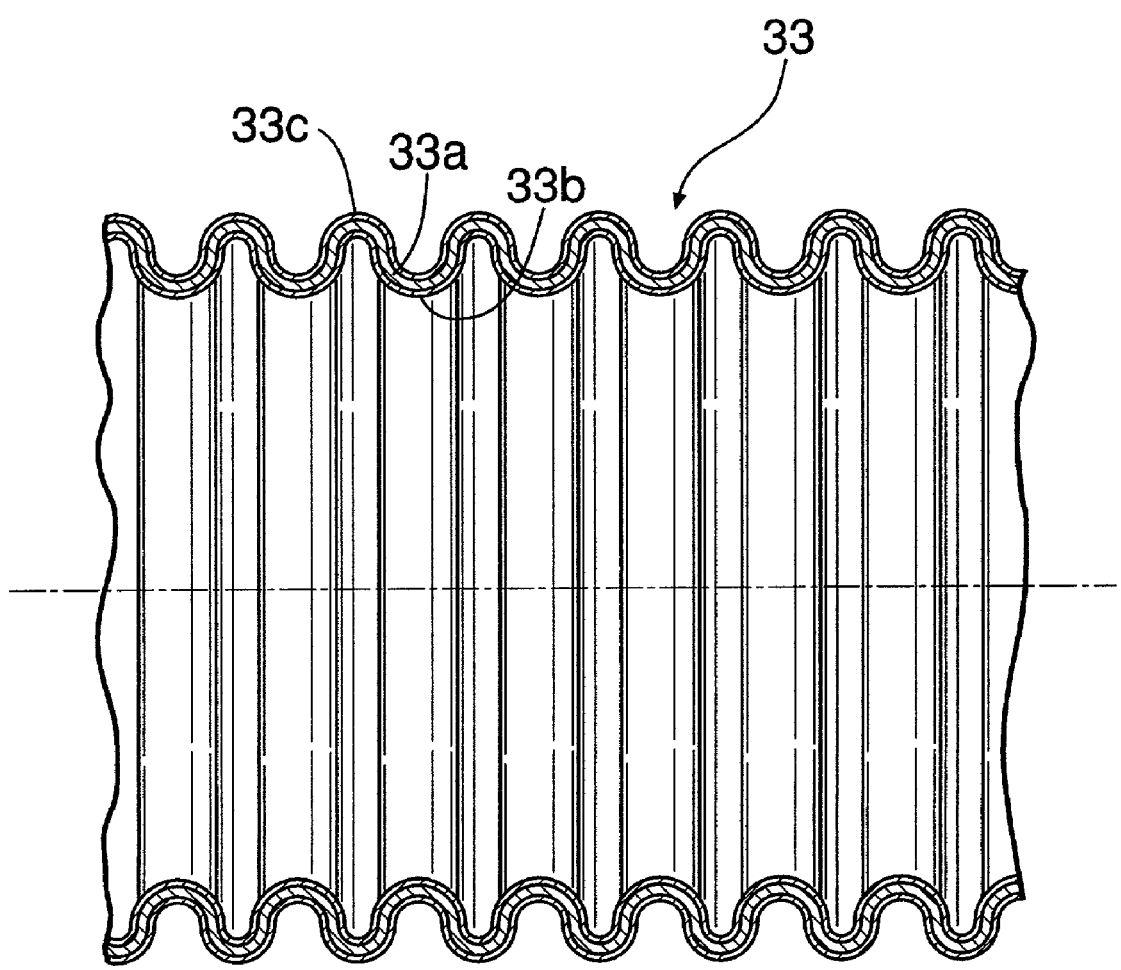

Provided along the upper edge of the airbag 21 are a plurality of (for example, five) impact absorbing member supports 21a. An impact absorbing member 33, which is a corrugated pipe, is integrated with the airbag 21 by means of the impact absorbing member supports 21a. As shown in FIG. 10, the impact absorbing member 33 is formed into a bellows having a circular cross section by laminating a main body 33a made of aluminum and inner and outer coverings 33b and 33c made of paper. The impact absorbing member 33 collapses by an external load to exhibit an effective impact-absorbing effect. A roof 34 is formed from an outer member 35, a center member 36, and an inner member 37. The upper ends of the four impact absorbing member supports 21a on the rear side of the airbag 21 are each fixed to the inner member 37 by means of two bolts 38 (see FIGS. 5 to 7). The front pillar 11 is formed from an outer member 39, a center member 40, and an inner member 41. The upper end of the impact absorbing member support 21a on the front end of the airbag 21 is fixed to the inner member 41 by means of two bolts 38 (see FIG. 8).

Since the folded airbag 21 and the impact absorbing member 33 are integrated in advance to form a module in this way, the mounting operation therefor becomes easy in comparison with a case where they are individually mounted in the vehicle body, thereby enhancing the operational efficiency and the precision of assembly. Moreover, since both the folded airbag 21 and the corrugated pipe impact absorbing member 33 are flexible, they can be placed easily along the curved roof side rail 18.

Figure 4:
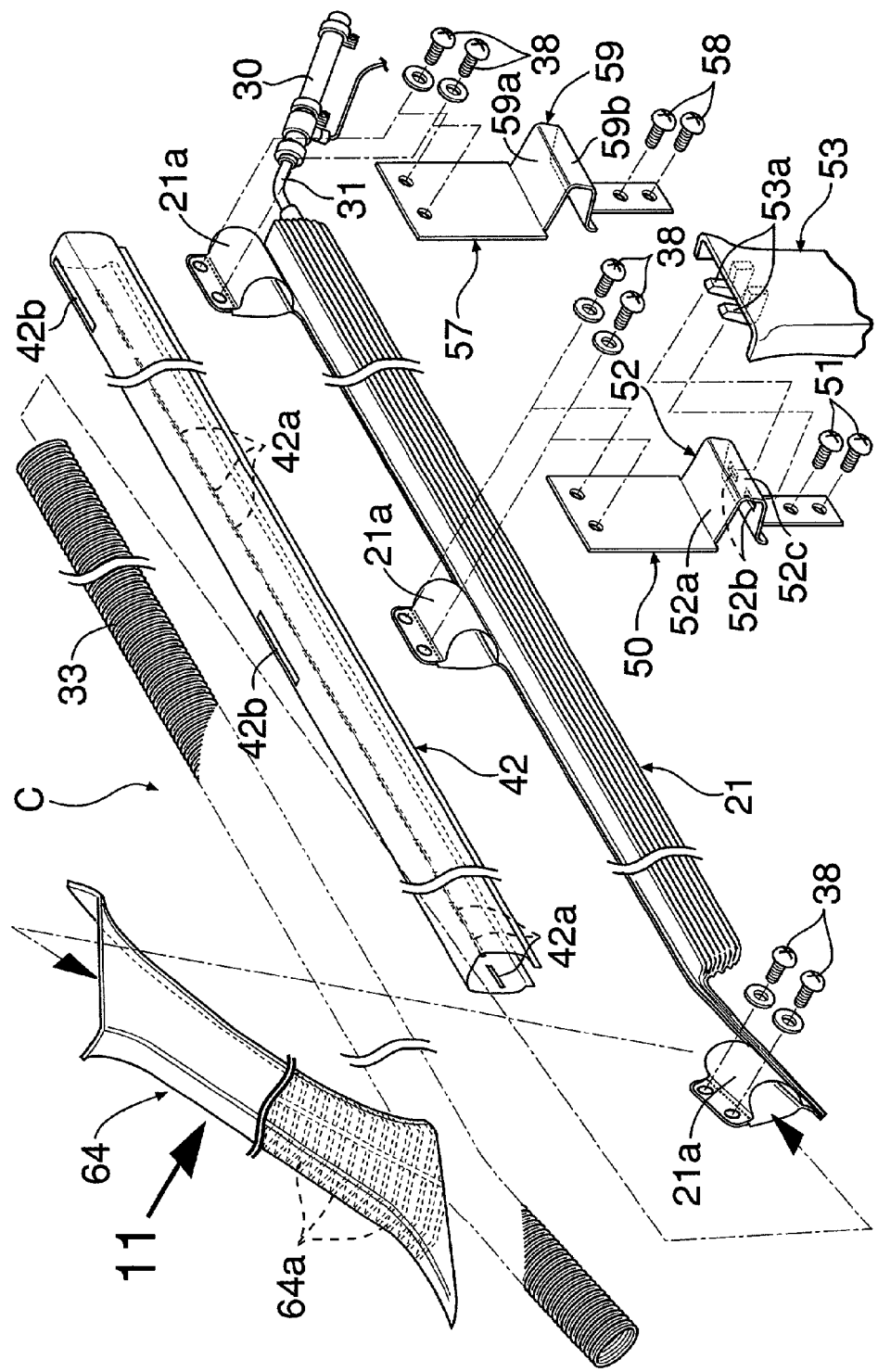

As is clear from FIG. 4, the folded airbag 21 is housed within an airbag cover 42 formed from a nonwoven fabric. The airbag cover 42 is made by sewing along the lower edges of a tube formed from a rectangular piece of cloth, and includes, on the side facing the roof side rail 18, perforation slits 42a that can be ruptured easily. The impact absorbing member supports 21a projecting from the upper end of the airbag 21, pass through openings 42b formed on the upper face of the airbag cover 42 and project upward.

Figure 5:
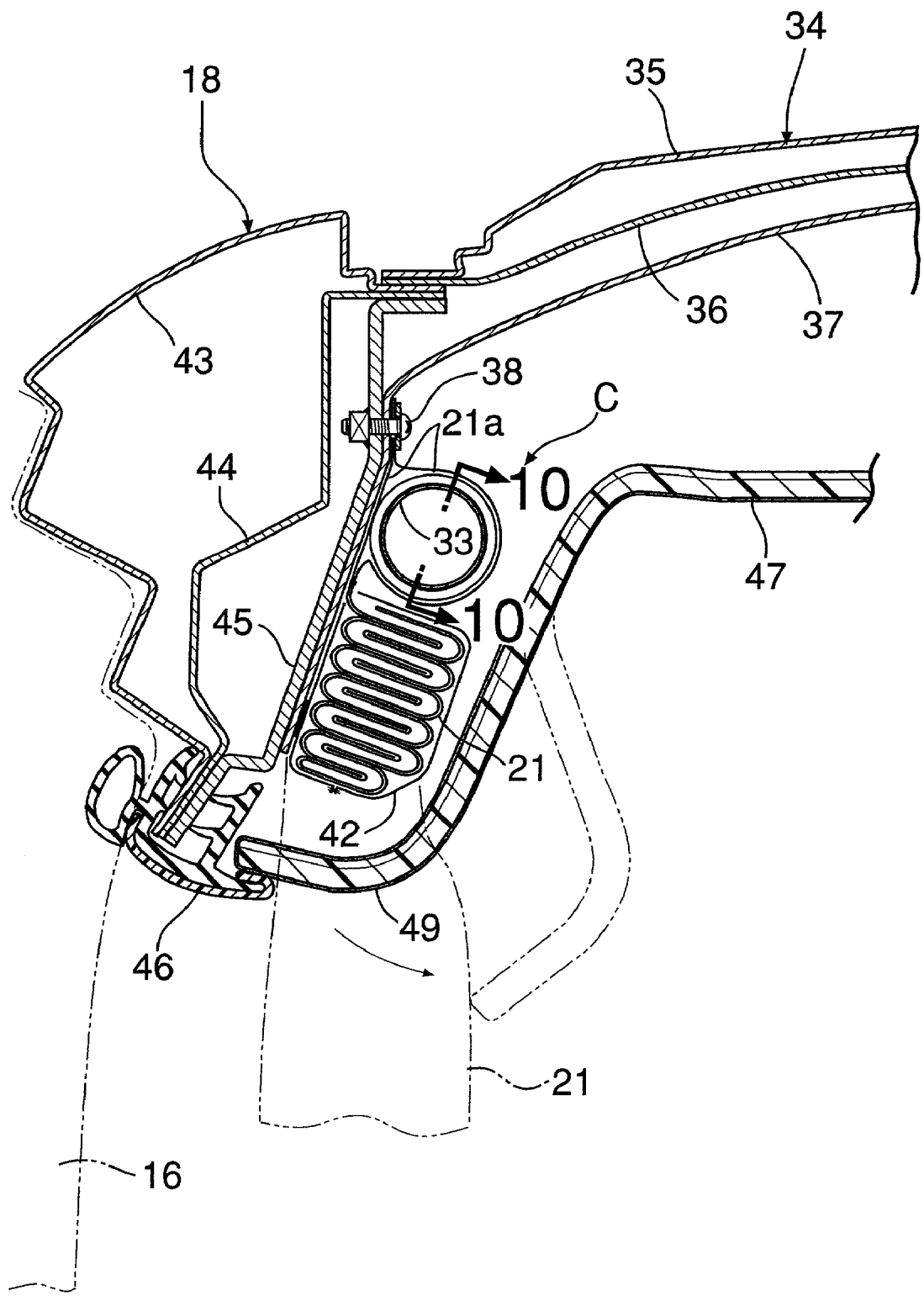

As is clear from FIG. 5, a weather strip 46 that can make contact with the rear door 16 (or the front door 13) is provided on the lower end of the roof side rail 18 formed from an outer member 43, a center member 44, and an inner member 45. The edge of a synthetic resin roof garnish 47 positioned along the lower face of the roof 34 latches on the edge of the weather strip 46 projecting from the lower end of the roof side rail 18 toward the occupant compartment. The occupant-compartment-facing lower face of the roof garnish 47 is covered with a skin material 49, and this skin material 49 is wrapped around the edge of the roof garnish 47 from the lower face side to the upper face side. It is possible thereby to prevent the edge of the synthetic resin roof garnish 47 from splitting and scattering when it is exposed to an impact.

Figure 6:
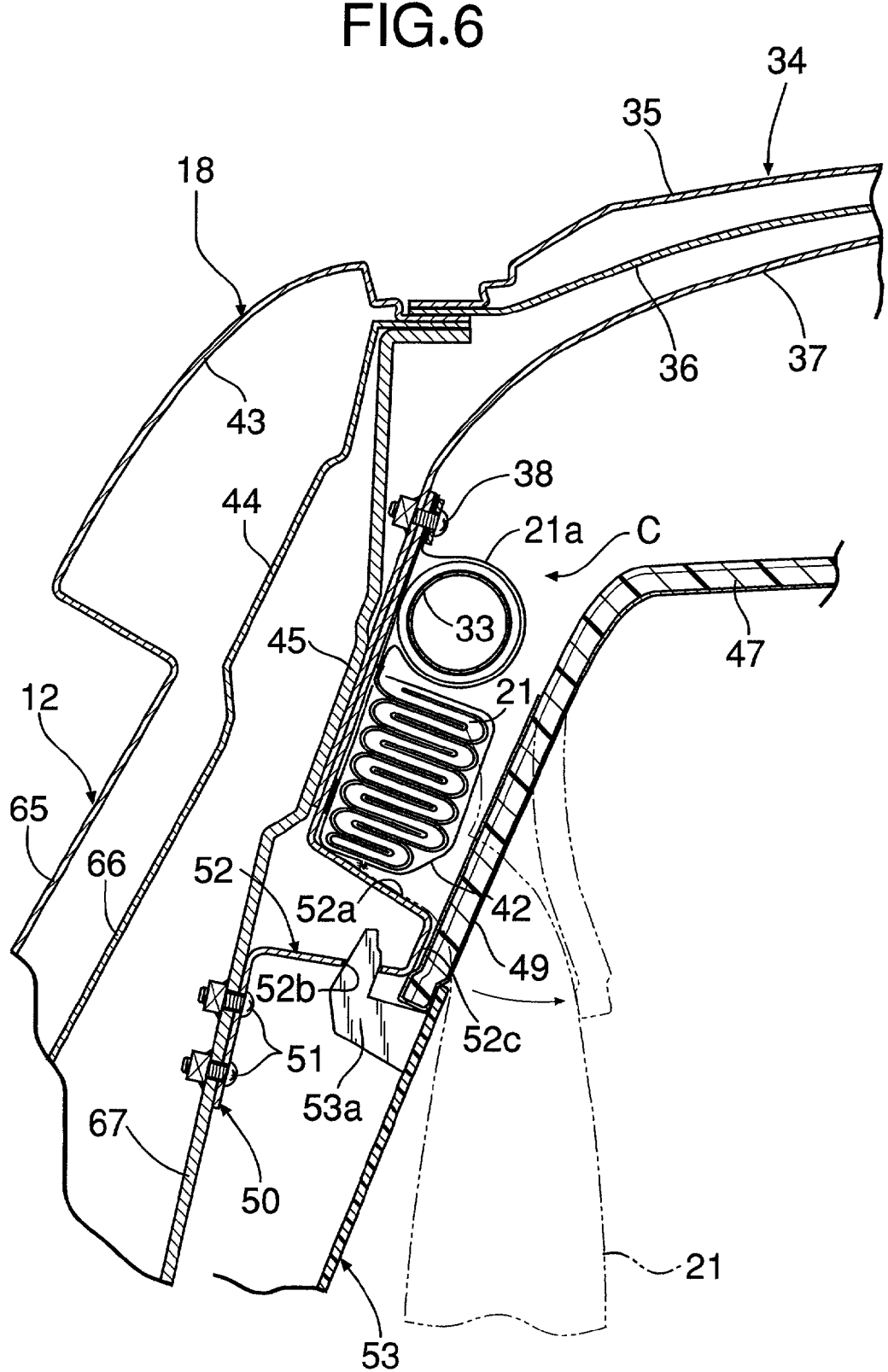

As is clear from FIGS. 4 and 6, the center pillar 12 extending downward from the roof side rail 18 is formed from an outside panel 65, a stiffener 66, and a center pillar inner portion 67. A front bracket 50 is mounted extending from the inner member 37 of the roof 34 to the center pillar inner portion 67 of the center pillar 12. The front bracket 50 is formed by bending a metal sheet; its upper part is superimposed on the impact absorbing member support 21a of the airbag, and fixed together to the inner member 37 of the roof 34 by means of two bolts 38, and its lower part is fixed to the center pillar inner portion 67 of the center pillar 12 by means of two bolts 51.

Formed in the middle section of the front bracket 50 is a projection 52 projecting toward the occupant compartment.

A guide surface 52a formed on the upper face of the projection 52 faces the lower end of the folded airbag 21. Latches 53a projectingly provided on the inner face of an upper part of the center pillar garnish 53 engage with two latching holes 52b formed in the lower face of the projection 52. Formed on the inner face of the center pillar garnish 53 are a large number of impact absorbing ribs (not illustrated) in order to absorb the impact of a secondary collision to an occupant.

The upper part of the center pillar garnish 53 can thereby be fixed to the center pillar 12 without employing a special clip, etc. and, moreover, the center pillar garnish 53 can be fixed more securely in comparison with the case where a clip is employed. The lower edge of the roof garnish 47 is fixedly interposed between the top face 52c of the projection 52 of the front bracket 50 and the inner face at the upper end of the center pillar garnish 53.

Figure 7:
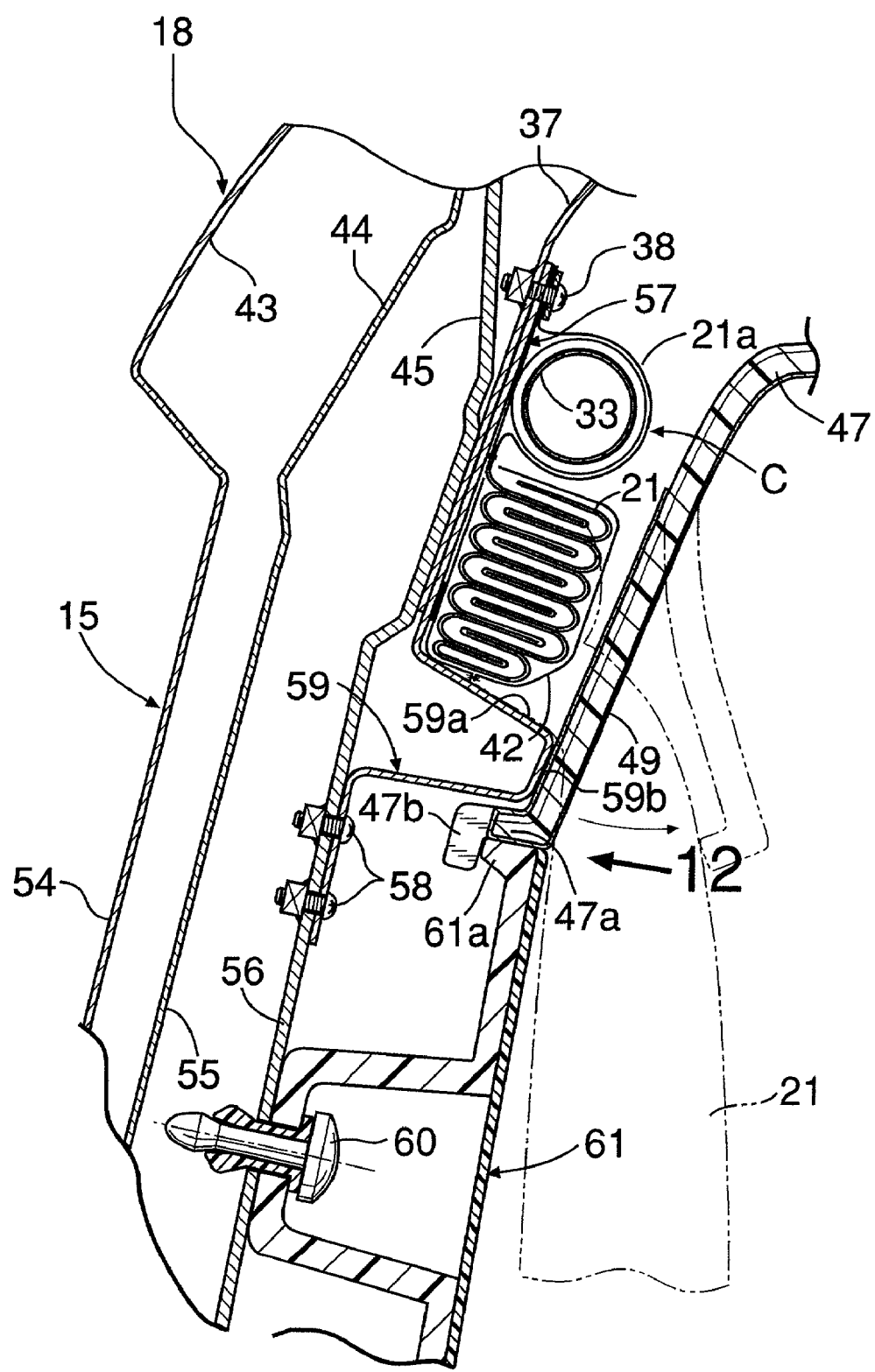
Figure 12:
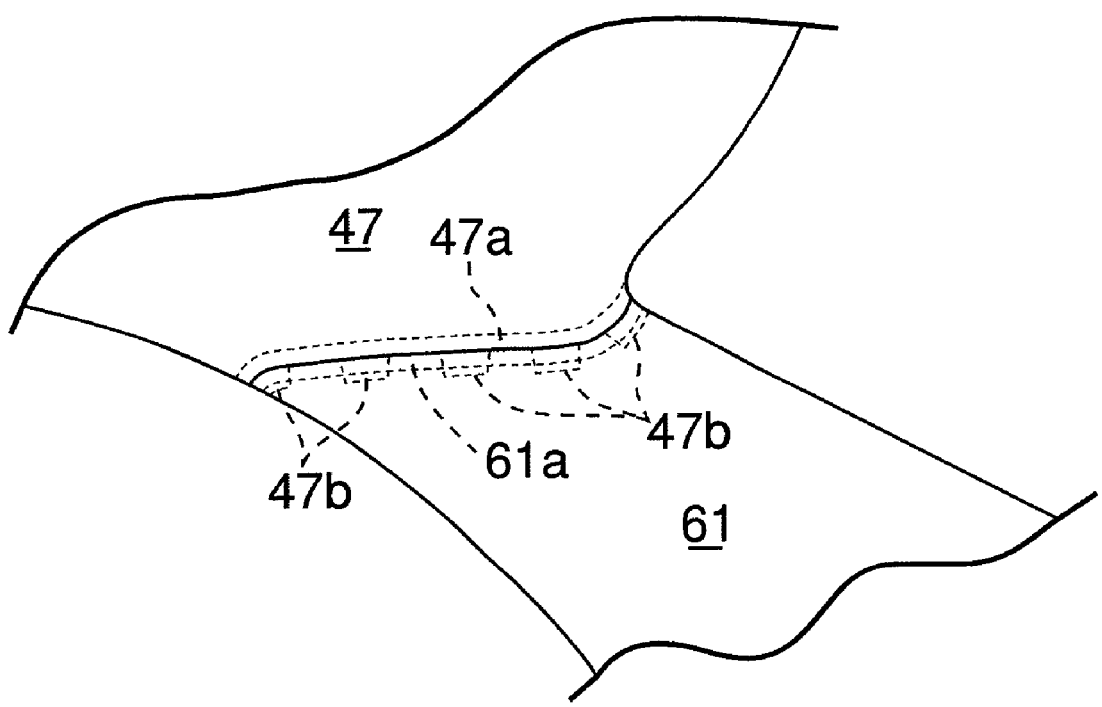

As is clear from FIGS. 4, 7 and 12, the rear pillar 15 extending downward from the roof side rail 18 is formed from an outer member 54, a center member 55, and an inner member 56. A rear bracket 57 is mounted extending from the inner member 37 of the roof 34 to the inner member 56 of the rear pillar 15. The rear bracket 57 has substantially the same shape as that of the front bracket 50; its upper part is superimposed on the impact absorbing member support 21a of the airbag 21, and fixed together to the inner member 37 of the roof 34 by means of two bolts 38, and its lower part is fixed to the inner member 56 of the rear pillar 15 by means of two bolts 58. Formed in the middle section of the rear bracket 57 is a projection 59 projecting toward the occupant compartment. A guide surface 59a formed on the upper face of the projection 59 faces the lower end of the folded airbag 21.

A rear pillar garnish 61 is fixed to the inner member 56 of the rear pillar 15 by means of a clip 60 and has on its upper end a flange 61a bending toward the outside of the vehicle body. Formed on the lower edge of the roof garnish 47 is a flange 47a that abuts against the flange 61a of the rear pillar garnish 61. The flange 47a of the roof garnish 47 has a plurality of (five in the embodiment) latches 47b projecting downward, and these latches 47b engage with the reverse face of the flange 61a of the rear pillar garnish 61. Formed on the inner face of the rear pillar garnish 61 are a large number of impact absorbing ribs (not illustrated) in order to absorb the impact of a secondary collision with an occupant.

Figure 8:
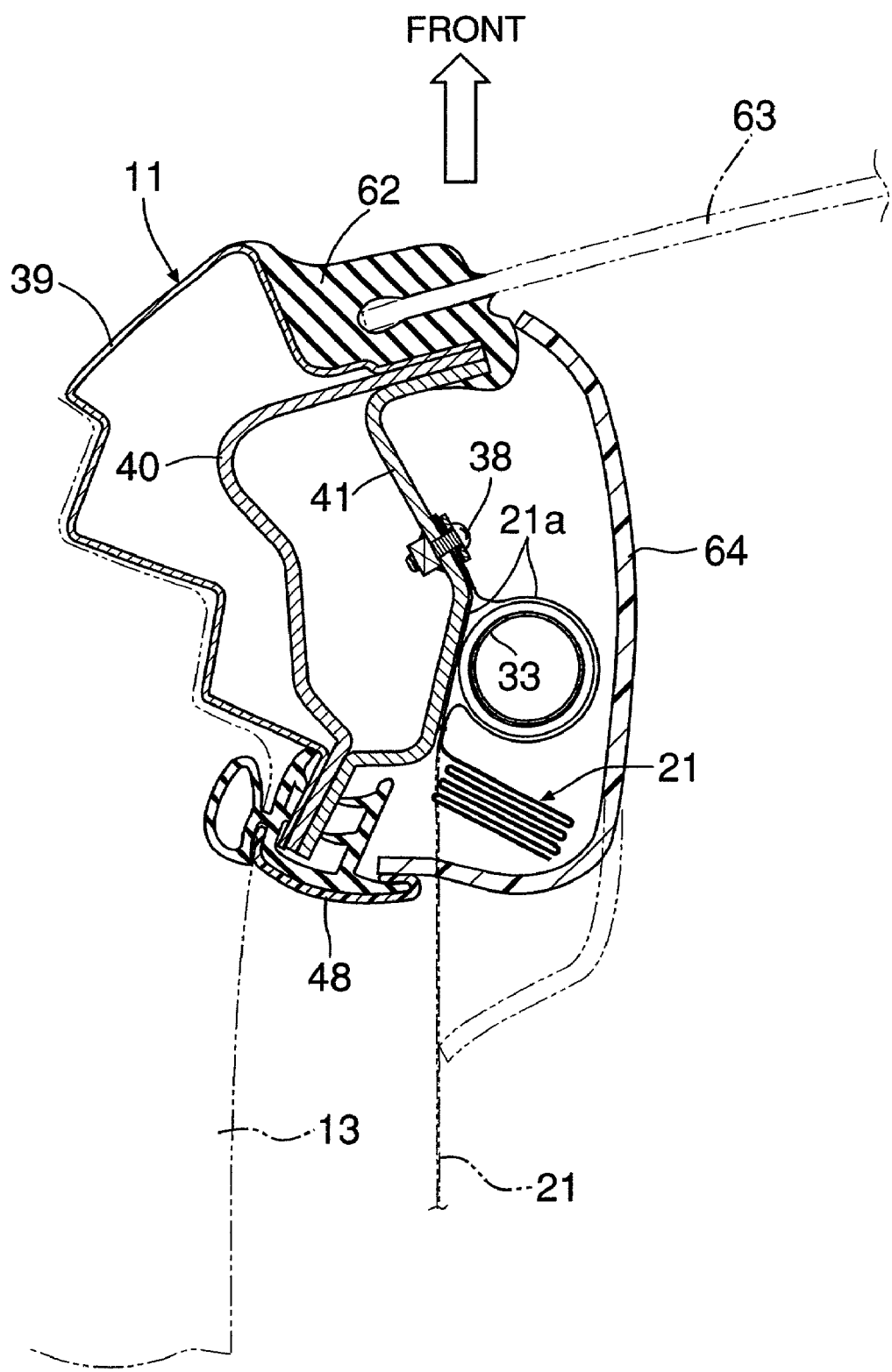
Figure 11:
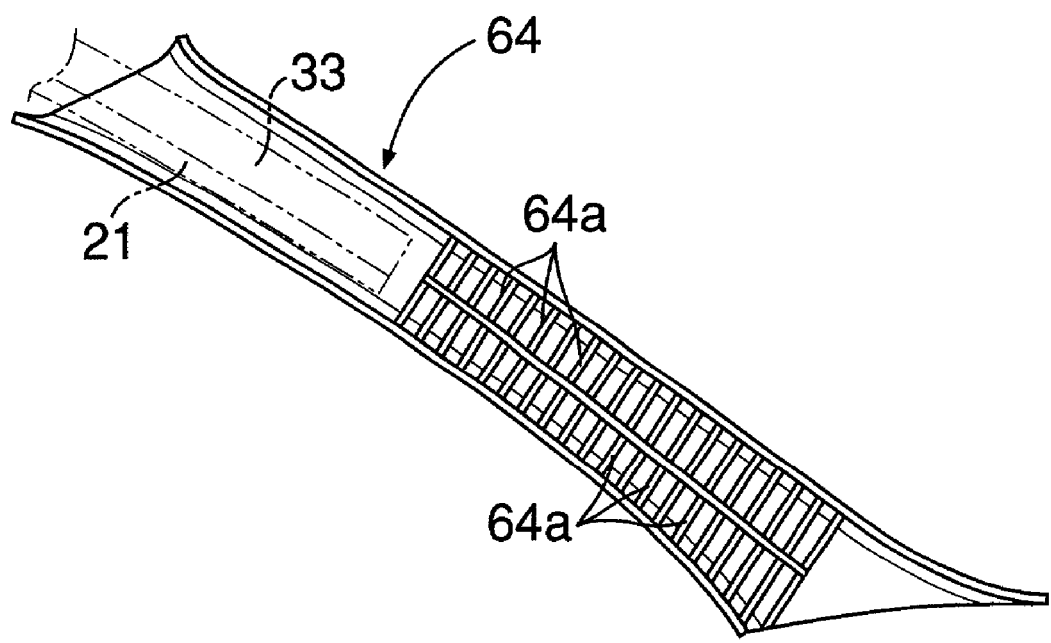

As shown in FIGS. 2, 8 and 11, a side edge of a windshield 63 is supported on the front face of the front pillar 11 via a rubber member 62. A front pillar garnish 64 having an arc-shaped curved cross section is mounted between the rubber member 62 and a weather strip 48 provided on the rear face of the front pillar 11. The upper half of the front pillar garnish 64 is hollow, and the folded non-inflatable part 21b on the front end of the airbag 21 and the front end part of the impact absorbing member 33 are housed therewithin. Integrally formed on the inner face of the lower half of the front pillar garnish 64, which houses neither the airbag 21 nor the impact absorbing member 33, are a large number of impact absorbing ribs 64a for absorbing an impact.

Housing the impact absorbing member 33 within the upper half of the front pillar garnish 64 and forming the large number of impact absorbing ribs 64a in the lower half of the front pillar garnish 64 in this way allows an impact absorbing effect to be exhibited over the whole length of the front pillar 11 while housing the front end part of the airbag 21 within the front pillar 11. Moreover, since no impact absorbing ribs 64a are formed in the upper half of the front pillar garnish 64 housing the front end part of the airbag 21, when the airbag 21 is deployed, the front pillar garnish 64 can be easily flexed, thus enabling the airbag 21 to be smoothly deployed and thereby reliably preventing a part of the front pillar garnish 64 from splitting and scattering.

As is clear from FIG. 13, the tip end of the gas supply pipe 31 extending within the upper communicating passage 29 of the airbag 21 is positioned in the rear of the front end of a wheelhouse 69 of a rear wheel 68 by a distance $\alpha$. Normal deployment of the airbag 21 may be inhibited when the gas supply pipe 31 is damaged upon a side collision of the vehicle, but since the wheelhouse 69 of the rear wheel 68 is positioned in the vicinity of the wide rear pillar 15 and the tip end of the gas supply pipe 31 is positioned so as not to project beyond the front end of the wheelhouse 69 in order to increase the rigidity of the vehicle body against deformation, the damage to the gas supply pipe 31 can be minimized or effectively prevented upon a side collision. Moreover, since the inflator 30 is housed within the rear pillar 15 which is wider and more rigid than the front pillar 11, the effect of protecting the inflator 30 can also be enhanced.

As shown in FIG. 1, a front side-collision sensor 71 and a rear side-collision sensor 72 are connected to an electronic control unit 73, and when the electronic control unit 73 detects a vehicle side collision (or a vehicle rollover) based on signals from the two acceleration sensors 71 and 72, the electronic control unit 73 outputs an operation signal to the inflator 30 so as to deploy the airbag 21.

Figure 14:
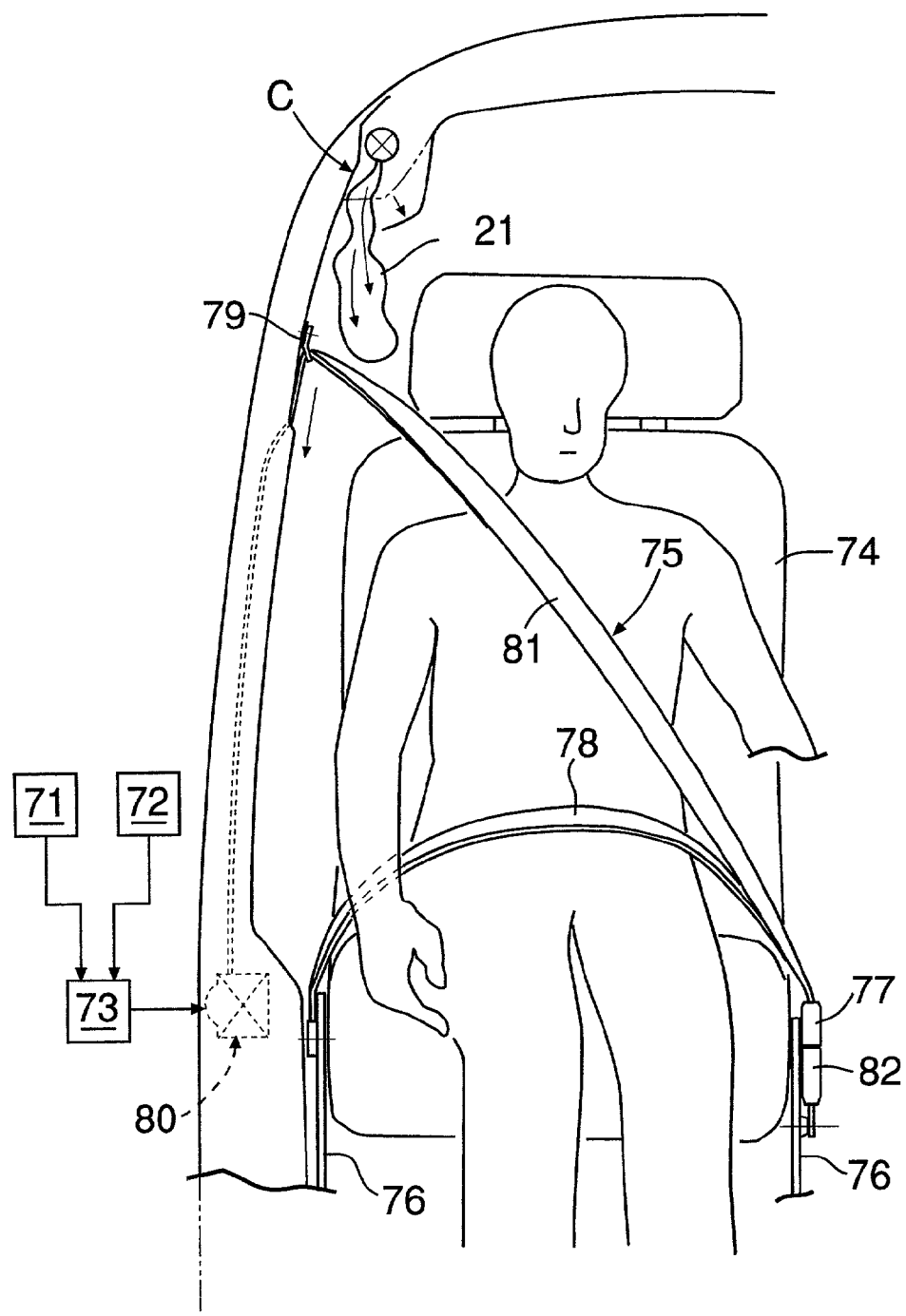

As shown in FIG. 14, a seat belt system 75 for restraining an occupant seated in a front seat 74 includes a lap belt 78 and a shoulder belt 81. One end of the lap belt 78 is fixed to a seat frame 76, and the other end thereof passes slidably through a slit formed in a tongue 77. One end of the shoulder belt 81 is integrally connected to said other end of the lap belt 78, and the other end of the shoulder belt 81 is wound up by a retractor 80 provided in a lower part of the center pillar 12, via a slit guide 79 provided on the center pillar 12. When the tongue 77 is pulled so as to couple it to a buckle 82 fixed to the seat frame 76 in a normal situation, the shoulder belt 81 can be freely drawn out from the retractor 80, but when a front collision sensor (not illustrated) detects a vehicle front collision, the retractor 80 equipped with a known pre-tensioner operates so as to draw in said other end of the shoulder belt 81, thereby reliably restraining the occupant in the front seat 74.

Next, the operation of the above-mentioned embodiment is explained.

When the front side-collision sensor 71 and the rear side-collision sensor 72 detect a vehicle side collision, the inflator 30 operates on an instruction from the electronic control unit 73, and the gas stored under pressure within the inflator 30 flows into the thirteen cells 28 via the gas supply pipe 31 and the upper communicating passage 29, thus inflating the thirteen cells 28. Inflating the airbag 21 ruptures the slits 42a of the airbag cover 42, and the airbag 21 whose restraint has been released deploys downward.

As shown in FIG. 5, in the door openings 14 and 17 of the front door 13 and the rear door 16, the lower edge of the roof garnish 47 is pressed downward due to the pressure of the deploying airbag 21, thus releasing the engagement with the weather strip 46 to form an opening therewith, and the airbag 21 deploys downward within the occupant compartment through the opening so formed.

As shown in FIG. 6, at the position of the center pillar 12, the lower edge of the roof garnish 47 is pressed downward due to the pressure of the deploying airbag 21, thus releasing the engagement with the upper end of the center pillar garnish 53 to form an opening therewith, and the airbag 21 deploys downward within the occupant compartment through the opening so formed.

Since the center pillar garnish 53 covering a side face, on the occupant compartment side, of the center pillar 12 is fixed to the front bracket 50 rather than to the center pillar 12, even when the upper part of the center pillar 12 is deformed relative to the roof side rail 18 because of a vehicle side collision, there is little change in the positional relationship between the center pillar garnish 53 and the airbag 21 supported in the upper part of the front bracket 50. This arrangement, together with secure fixing of the center pillar garnish 53 to the front bracket 50 by means of the latches 53a rather than by a clip, makes it difficult for the deploying airbag 21 to catch on the upper end of the center pillar garnish 53, thereby guaranteeing reliable deployment of the airbag 21.

Moreover, since the deploying airbag 21 is guided obliquely downward toward the occupant compartment along the tilted guide surface 52a of the projection 52 of the front bracket 50, the airbag 21 can be deployed yet more smoothly while avoiding any interference with the center pillar garnish 53.

As shown in FIG. 7, at the position of the rear pillar 15, the lower edge of the roof garnish 47 is pressed downward due to the pressure of the deploying airbag 21, thus releasing the engagement with the upper end of the rear pillar garnish 61 to form an opening therewith, and the airbag 21 deploys downward within the occupant compartment through the opening so formed. In this process, the deploying airbag 21 is guided obliquely downward toward the occupant compartment along the tilted guide surface 59a of the projection 59 of the rear bracket 57. Therefore, the airbag 21 can be deployed smoothly while avoiding any interference with the rear pillar garnish 61.

Furthermore, since the position of the vicinity of the lower edge of the roof garnish 47 is determined by clamping it from opposite sides between the top face 59b of the projection 59 and the flange 61a of the rear pillar garnish 61, the two flanges 47a and 61a abut against each other without forming any step, thereby improving the appearance. Moreover, since the latches 47b of the roof garnish 47 flex and easily disengage from the flange 61a of the rear pillar garnish 61 when the airbag 21 is being deployed, it is possible to reliably form an opening between the roof garnish 47 and the rear pillar garnish 61, through which the airbag 21 is deployed. If the entire lower edge of the roof garnish 47 were engaged with the reverse face of the upper edge of the rear pillar garnish 61, it would become difficult to smoothly separate the lower edge of the roof garnish 47 from the upper edge of the rear pillar garnish 61 when the airbag 21 deploys.

As shown in FIG. 8, at the position of the front pillar 11, the rear edge of the front pillar garnish 64 is pressed downward due to the pressure of the deploying airbag 21, thus releasing the engagement with the weather strip 48 to form an opening therewith, and the airbag 21 deploys downward within the occupant compartment through the opening so formed.

When the acceleration caused by a side collision is equal to or less than a predetermined value, the occupant restraint system C does not operate, but when the impact causes a secondary collision between an occupant and the lower edge of the roof garnish 47 facing the roof side rail 18 or an upper part of the front pillar garnish 64, not only does the corrugated pipe impact absorbing member 33 collapse, thus absorbing the impact, but also the folded airbag 21 exhibits a function of enhancing the impact absorbing effect. In this case, since the impact absorbing member 33 is supported being in contact with the inner member 37 of the roof 34 and the inner member 41 of the front pillar 11 (see FIGS. 5 to 8), the impact absorbing member 33 reliably collapses by pressure from these inner members 37 and 41, thereby effectively absorbing the impact of the secondary collision.

The pre-tensioner of the retractor 80 connected to the electronic control unit 73 operates not only when there is a vehicle front collision but also when a vehicle side collision is detected by the front side-collision sensor 71 and the rear side-collision sensor 72. Accordingly, prior to the deploying of the airbag 21 upon a vehicle side collision, the pre-tensioner applies a tension to the lap belt 78 and the shoulder belt 81 of the seat belt system 75 so that they interfere with the airbag 21 deploying downward, thereby reliably preventing the shoulder belt 81 from being displaced from the shoulder of the occupant.

Figure 15:
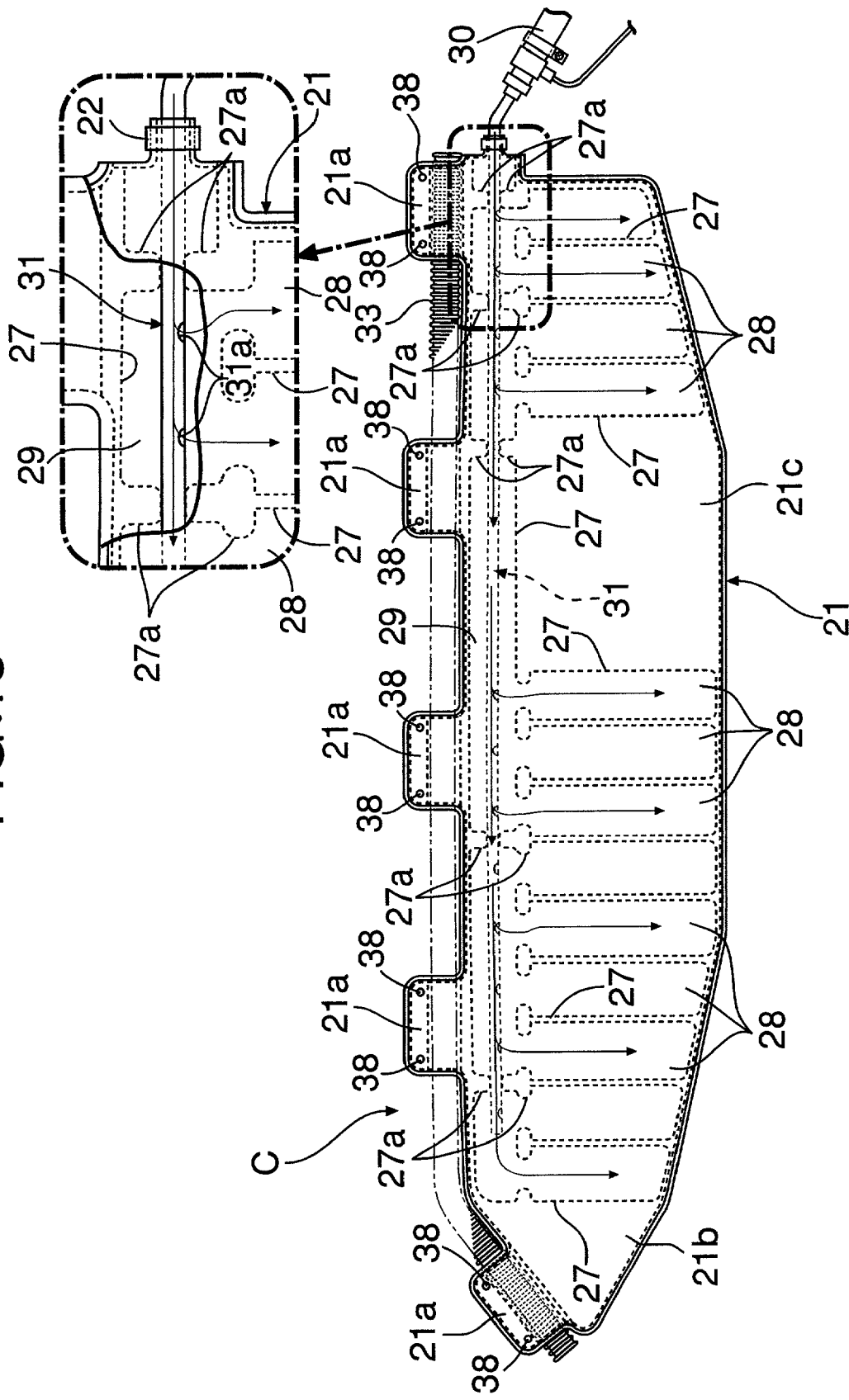
FIG. 15 is a view, corresponding to FIG. 3, of a second embodiment of the present invention.

Next, the second embodiment of the present invention is explained by reference to FIG. 15.

In the second embodiment, a gas supply pipe 31 leading to an inflator 30 extends to the vicinity of the front end of an upper communicating passage 29 of an airbag 21, and a gas is distributed into each of cells 28 via a plurality of through holes 31a formed in a middle section of the gas supply pipe 31. Since the gas supply pipe 31 is long, it is supported at a plurality of points (for example, five points) in the longitudinal direction by pipe supports 27a formed from stitching 27.

Figure 16:
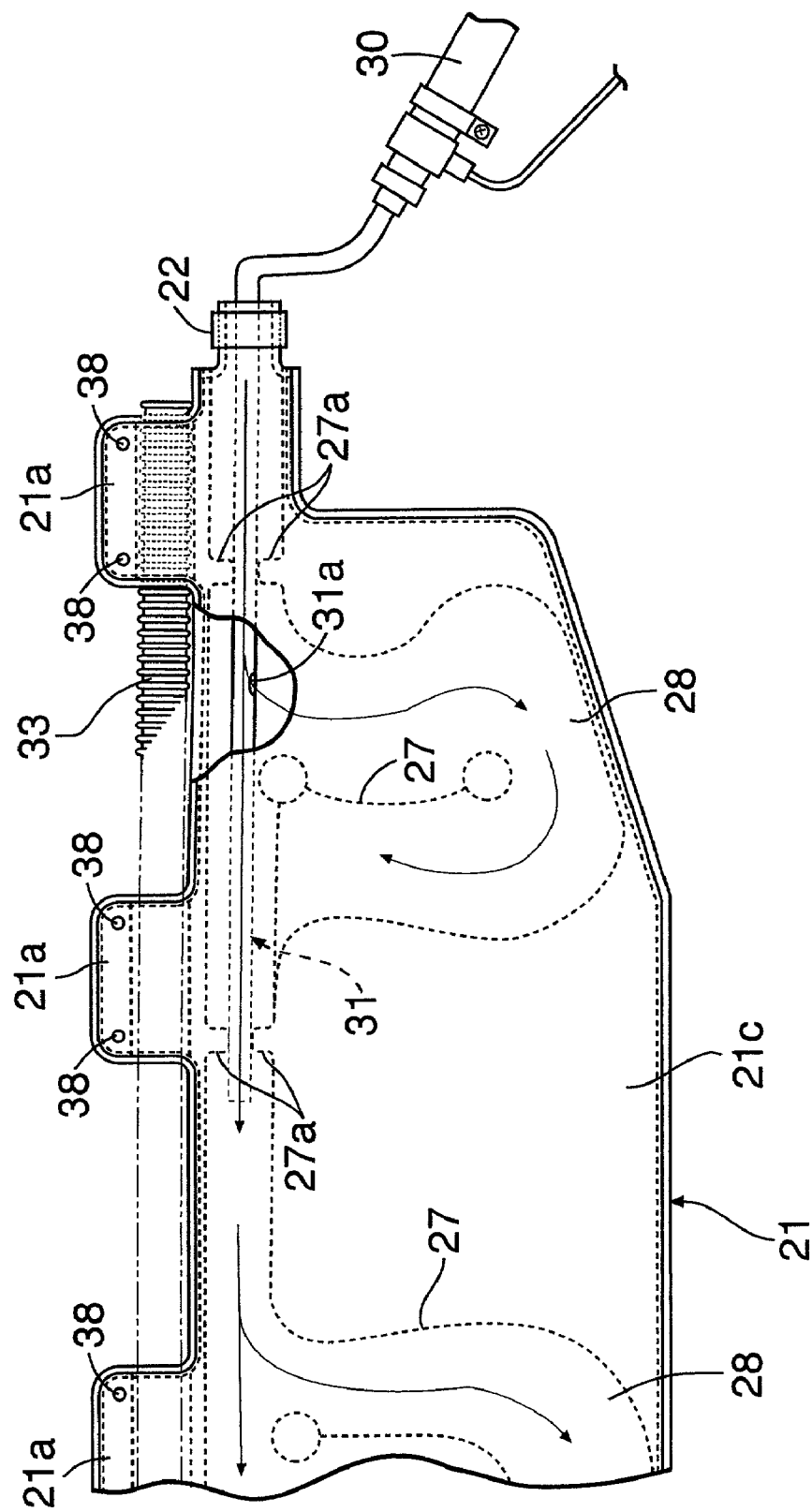
FIG. 16 is a view, corresponding to FIG. 3, of a third embodiment of the present invention.

Next, the third embodiment of the present invention is explained by reference to FIG. 16.

Although the airbags 21 of the first and second embodiments have a large number of linear cells 28 extending parallel to each other, an airbag 21 of the third embodiment has non-linear cells 28 at two positions corresponding to a side of a front seat and a side of a rear seat, and a gas supply pipe 31 leading to an inflator 30 is inserted into an upper communicating passage 29 extending in the longitudinal direction above the two cells 28. The front end of the gas supply pipe 31 extends to above a non-inflatable part 21c positioned between the front and rear cells 28. The gas supply pipe 31 is supported by pipe supports 27a formed from stitching 27 at two positions to the front and rear of the rear cell 28. A gas is supplied to the front cell 28 via an opening at the extremity of the gas supply pipe 31 and to the rear cell 28 via a through hole 31a formed in a middle section of the gas supply pipe 31.

The second and third embodiments can thus give the same effect as that of the first embodiment.

Figure 17:
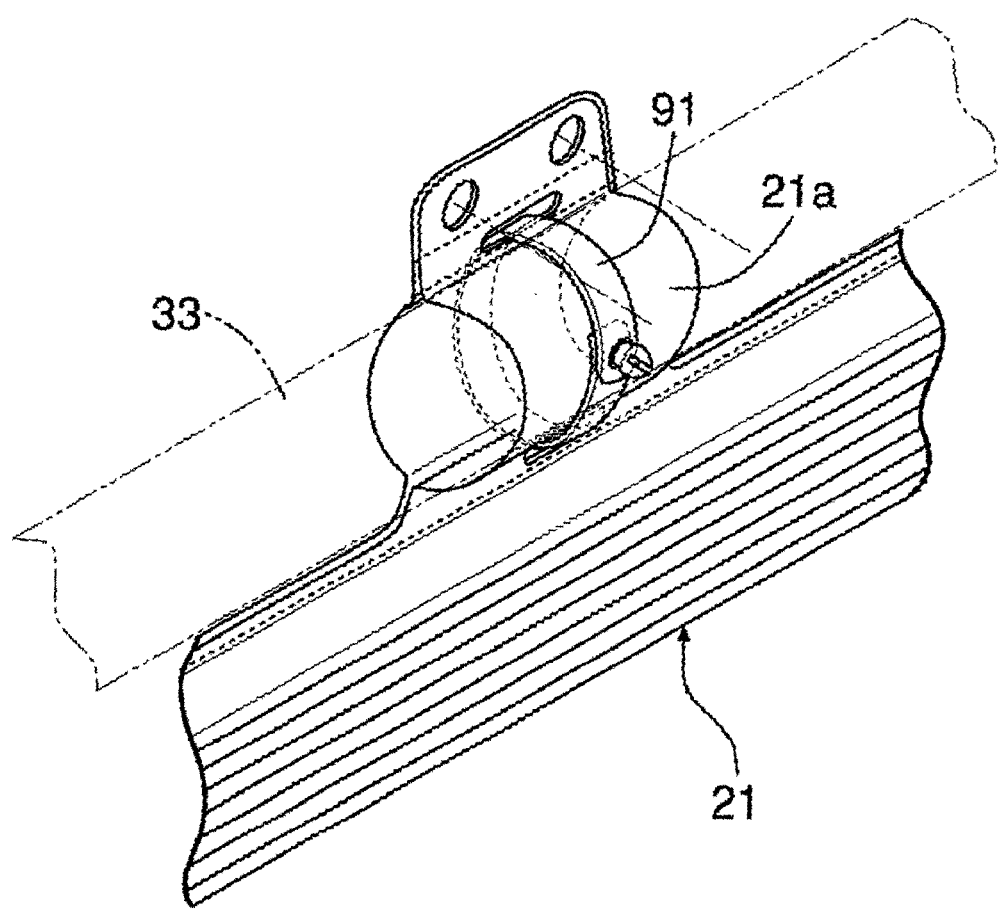
FIG. 17 is an enlarged perspective view of an impact absorbing member support of a fourth embodiment of the present invention.

Next, the fourth embodiment of the present invention is explained by reference to FIG. 17.

In the first embodiment, the impact absorbing member 33 is clamped and fixed by the impact absorbing member support 21a formed integrally with the airbag 21, but in the fourth embodiment a metal band 91 is wrapped around both an impact absorbing member support 21a and an impact absorbing member 33, thereby integrating the two more firmly.

Figure 18:
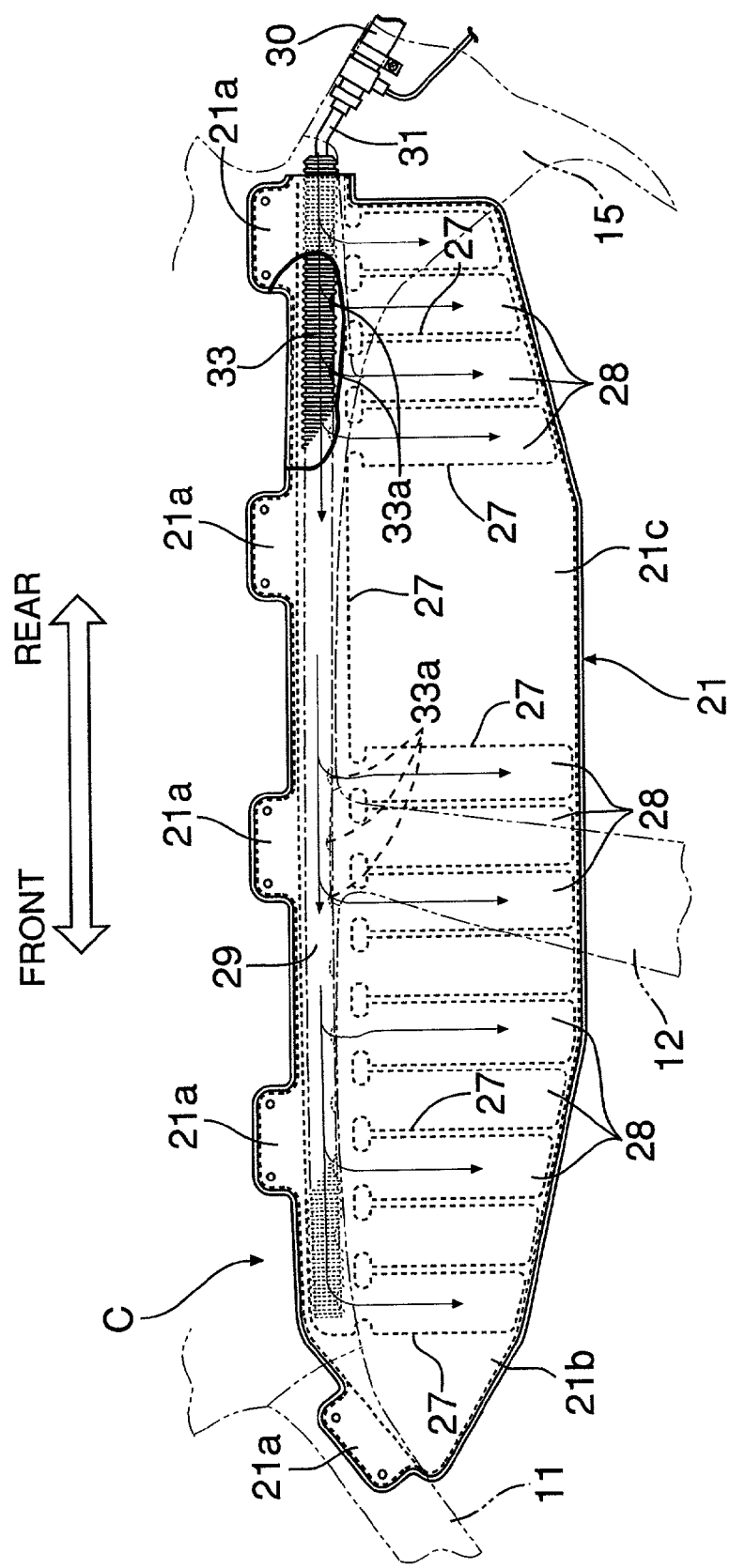
FIG. 18 is a view, corresponding to FIG. 3, of a fifth embodiment of the present invention.

Next, the fifth embodiment of the present invention is explained by reference to FIG. 18.

In the first embodiment, the impact absorbing member 33 is positioned outside the airbag 21, but in the fifth embodiment an impact absorbing member 33 is inserted into an upper communicating passage 29 of an airbag 21, thereby integrating the two. In this case, a gas is distributed to each of cells 28 via a large number of through holes 33a formed in the impact absorbing member 33.

Figure 19:
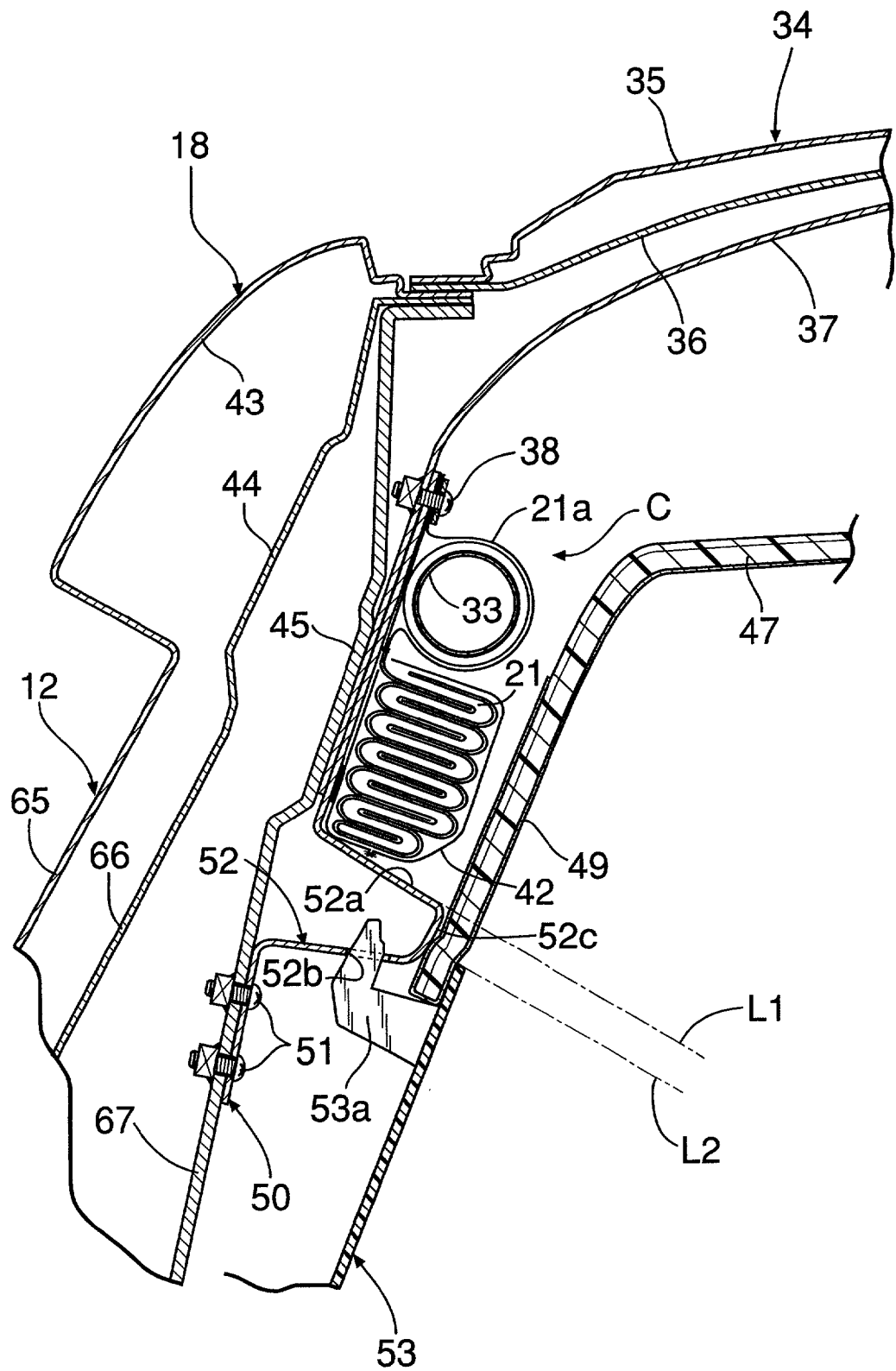
Figure 20:
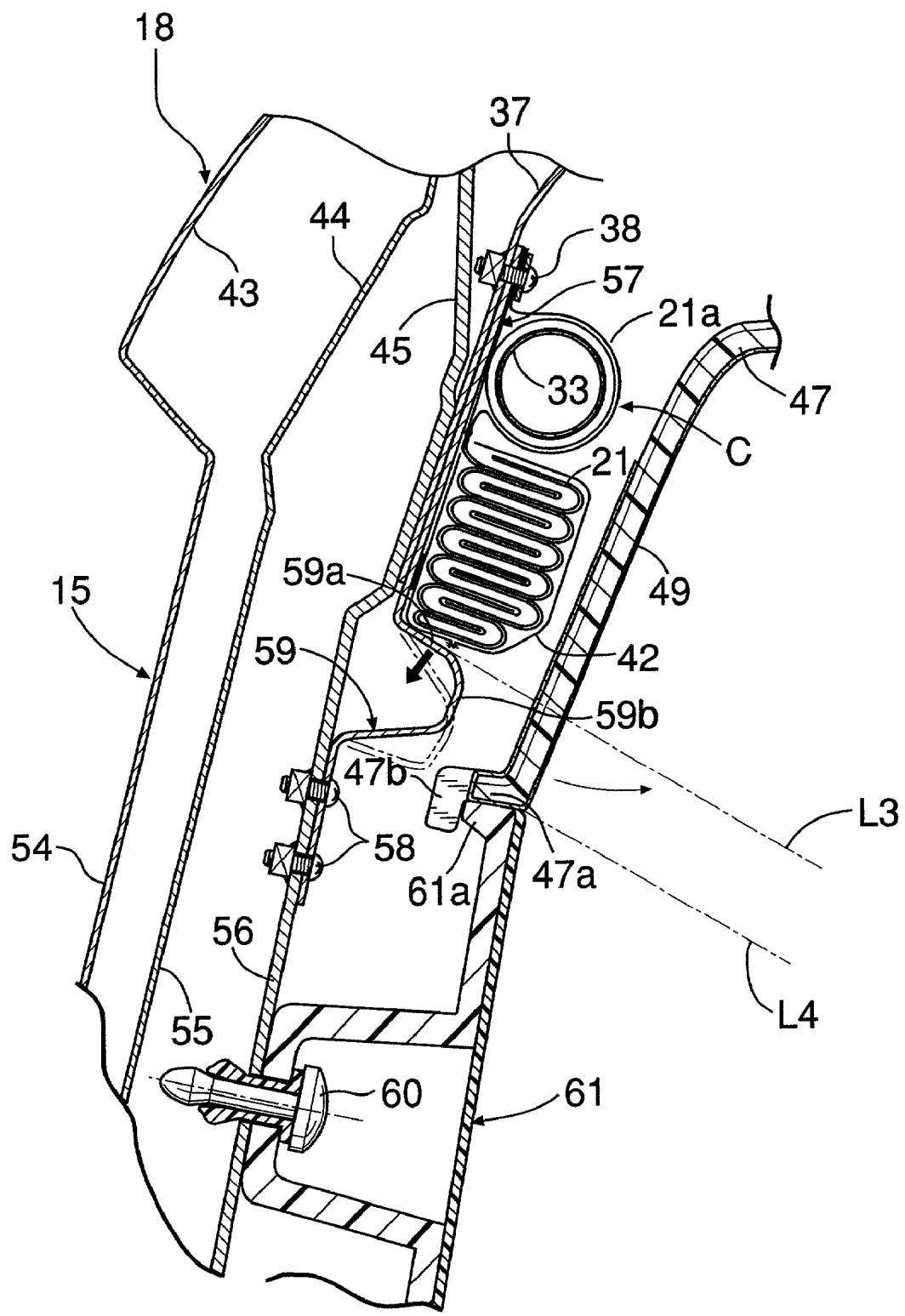
Figure 22:
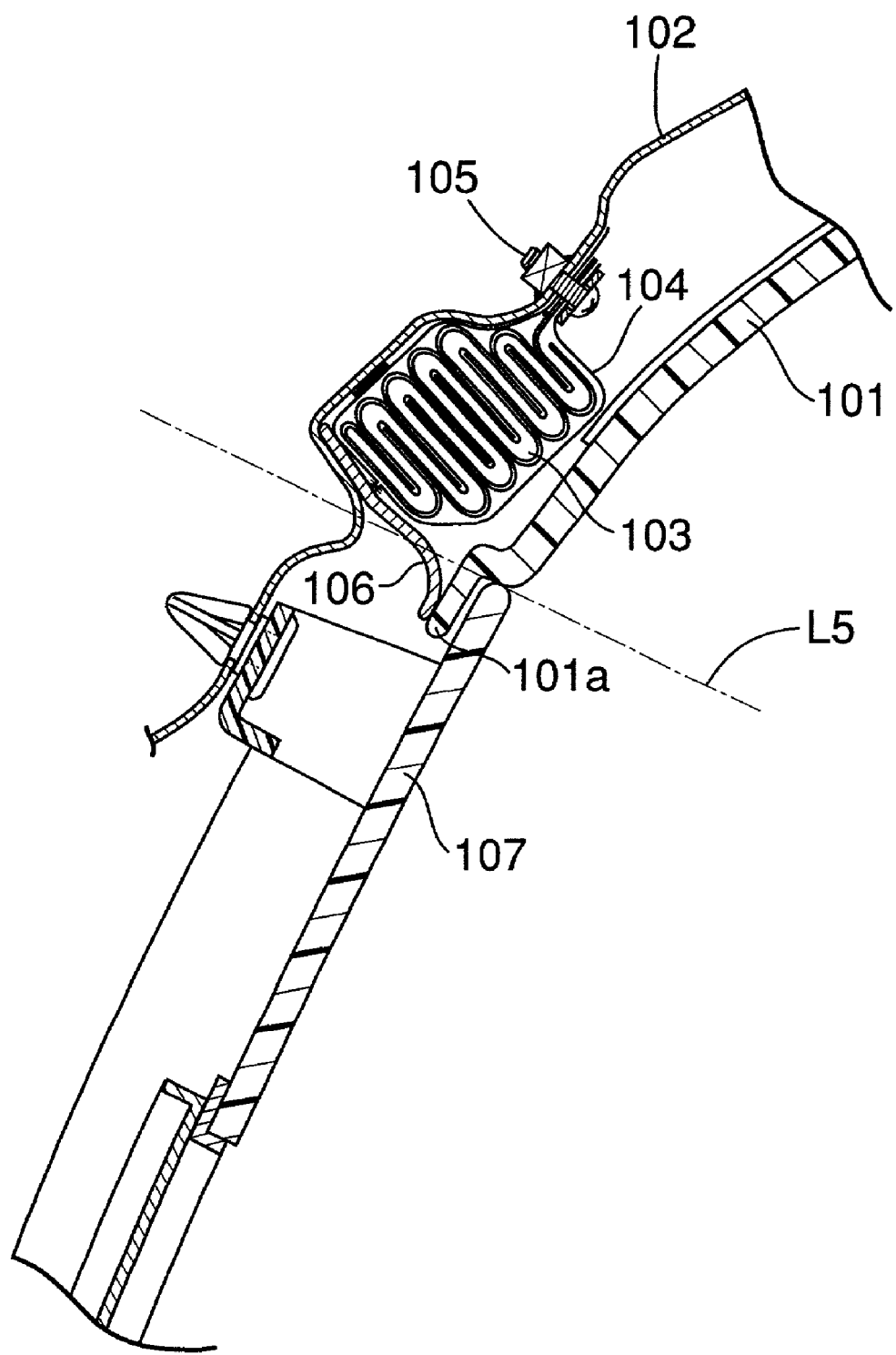
FIG. 22 is a view, corresponding to FIG. 6, of a prior art.

Next, the sixth embodiment of the present invention is explained by reference to FIGS. 19 to 21B. FIG. 19 is a view corresponding to FIG. 6, FIG. 20 is a view corresponding to FIG. 7, and FIGS. 21A and 21B are explanatory drawings corresponding to FIG. 19. In the present embodiment, members corresponding to those of the first embodiment are denoted by the same reference numerals and symbols as in the first embodiment, and duplication of the explanation is omitted.

Referring to FiG. 19, a line L1 extending from the extremity of a guide face 52a of a projection 52 of a front bracket 50 is positioned above a parting line L2 by a predetermined distance (hereinafter, this position is called an upper position), the parting line denoting a border where the extremity of a center pillar garnish 53 abuts against a roof garnish 47. The front bracket 50 is a rigid member produced from a metal or a resin, and when an airbag 21 deploys the front bracket 50 can be deformed and replaced from the position shown in FIG. 19 to a position shown in FIGS. 21A and 21B (hereinafter, called a lower position).

When a front side-collision sensor 71 and a rear sensor 72 detect a vehicle side collision, an inflator 30 operates on a command from an electronic control unit 73, and a gas stored under pressure within the inflator 30 flows into thirteen cells 28 via a gas supply pipe 31 and an upper communicating passage 29, thus inflating the thirteen cells 28. Slits 42a of an airbag cover 42 are ruptured by inflation of the airbag 21, and the airbag 21 whose restraint has been released deploys downward.

Turning to FIG. 21A, the deploying airbag 21 comes into contact with the guide face 52a of the projection 52 of the front bracket 50, thus pushing down the guide face 52a in the direction shown by the black arrow. The projection 52 drops until movement of a latching hole 52b is restrained by a latch 53a, and the line L1 extending from the extremity of the guide face 52a is substantially aligned with the parting line L2. As a result, the airbag 21 deploys along the guide face 52a of the projection 52 in a direction toward the extremity of the roof garnish 47 as shown by the white arrow of FIG. 21A, thus pushing out the roof garnish 47 inside the occupant compartment. The positional relationship between the extension line L1 and the parting line L2 in FIG. 21A is simply an example; the extension line L1 may be positioned above the parting line L2, or the extension line L1 may coincide with the parting line L2.

An opening is thus formed between the center pillar garnish 53 and the roof garnish 47 as shown in FIG. 21B, and the airbag 21 bursts out and deploys through the opening downward within the occupant compartment, that is, in the direction shown by the white arrow of FIG. 21B. While the airbag 21 continues to inflate, the projection 52 is held in the lower position.

Since the arrangement is such that the projection 52 can be deformed from the upper position above the parting line L2 where the roof garnish 47 is in contact with the center pillar garnish 53 to the lower position in the vicinity of the parting line L2 as the airbag 21 inflates, the projection 52 guides the airbag 21 toward the extremity of the roof garnish 47 while the projection 52 becomes deformed by a force generated by deployment of the airbag 21, thereby allowing the roof garnish 47 to be reliably pushed out inside the occupant compartment. Furthermore, since the projection 52 is expected to deform, it is unnecessary to employ a high strength member or a special fixing means, and since there is no requirement for precision in mounting, it is possible to shorten the production process and reduce the cost of materials. If the projection 52 is formed from an impact absorbing material, the protection characteristics against impact can be further enhanced.

Moreover, in the present embodiment, since the center pillar garnish 53 and the projection 52 are connected by engaging the latch 53a, which extends from the center pillar garnish 53, with the projection 52, the position where the airbag 21 is fixed and the position of the center pillar garnish 53 are maintained at a defined distance apart. When the position of the center pillar garnish 53 is fixed, the position of the roof garnish 47 is then fixed, and the position of the parting line L2 is determined. Since the position of the parting line L2 relative to the position where the airbag 21 is fixed is thus determined by the latch 53a, the stability of the deployment characteristics of the airbag 21 can be further enhanced.

The extent to which the projection 52 is deformed, that is, the amount of downward movement of the projection 52, can be controlled by means of the material and shape of the projection 52 and the combination thereof with the shape of the latch 53a. For example, the extremity of the latch 53a is made to have a shape in which it becomes thicker toward its lower side, and the movement of the projection 52 can be restricted by engaging the latch 53a with the latching hole 52b of the projection 52. It is also possible to restrict movement of the projection 52 by making the extremity of the latch 53a come into contact with the guide face 52a of the projection 52. Furthermore, the latching hole 52b of the projection 52 can be made so as to be a long hole having its major axis in a direction toward the occupant compartment, and the length of the major axis thus restricts the amount of movement of the projection 52.

As shown in FIG. 20, a rear bracket 57 has substantially the same shape as that of the front bracket 50; its upper part is superimposed on and, together with the impact absorbing member support 21a of the airbag 21, fixed to an inner member 37 of a roof 34 by means of two bolts 38, and its lower part is fixed to an inner member 56 of a rear pillar 15 by means of two bolts 58. Formed in a middle section of the rear bracket 57 is a projection 59 projecting toward the occupant compartment, and a guide face 59a formed on the upper face of the projection 59 faces the lower face of the folded airbag 21.

A rear pillar garnish 61 is fixed to the inner member 56 of the rear pillar 15 by means of a clip 60 and has on its upper end a flange 61a bending toward the outside of the vehicle body, and formed on the lower edge of the roof garnish 47 is a flange 47a that abuts against the flange 61a of the rear pillar garnish 61. The flange 47a of the roof garnish 47 has a plurality of (five in the embodiment) latches 47b projecting downward, and these latches 47b engage with the reverse face of the flange 61a of the rear pillar garnish 61.

The height of the projection 59 of the rear bracket 57 is lower than the height of the projection 52 of the front bracket 50 so that, when the projection 59 of the rear bracket 57 deforms downward, it does not interfere with the latches 47b of the roof garnish 47. The projection 59 of the rear bracket 57 is provided in an arrangement such that, when the airbag 21 is not deployed, that is, when the projection 59 is in an upper position, a line L3 extending from the guide face 59a is positioned above a parting line L4 that is a border between the roof garnish 47 and the rear pillar garnish 61. The projection 59 is pushed down when the airbag 21 deploys and deforms to a lower position shown by the phantom line. At this point, the extension line L3 and the parting line L4 are substantially aligned.

The extremity of the roof garnish 47 has a larger step than that shown in FIG. 19. The reason that the step of the extremity of the roof garnish 47 is large in FIG. 20 is because, when the airbag 21 deploys, the extremity of the airbag 21 reliably makes contact with the extremity of the roof garnish 47, thereby pushing open the roof garnish 47 toward the occupant compartment.

The extent to which the projection 59 is deformed is large when the force imposed by deployment of the airbag 21 is large, and is small when the force imposed is small. This is because there is no latch 53a (see FIG. 19), to exhibit an effect when the vehicle body is deformed during a collision. That is, when the distance between the projection 59 and the airbag 21 is increased by the deformation of the vehicle body, since the force imposed by deployment of the airbag 21 on the projection 59 becomes smaller to an extent corresponding to the increase in the distance, the extent to which the projection 59 is deformed decreases. On the other hand, when the distance between the projection 59 and the airbag 21 is decreased by the deformation, since the force imposed by deployment of the airbag 59 on the projection 59 becomes larger to an extent corresponding to the decrease in the distance, the extent to which the projection 59 is deformed increases. In either case, since the extent to which the vehicle body is deformed and the extent to which the projection 59 is deformed counterbalance each other, the airbag 21 can always be deployed toward the parting line L4.

In this way, the line L3 extending from the guide face 59a of the projection 59 is positioned above the parting line L4, the projection 59 deforms accompanying collision or deployment of the airbag 21, and the airbag 21 can thereby be guided reliably to the vicinity of the extremity of the roof garnish 47.

Moreover, the large step of the extremity of the roof garnish 47 allows the airbag 21 to be reliably guided to the vicinity of the extremity of the roof garnish 47.

The means for integrating the airbag 21 and the impact absorbing member 33 is not limited by those in the embodiments, and any means can be employed. In the embodiments, one impact absorbing member 33 extends from the front pillar 11 to the rear pillar 15, but the impact absorbing member 33 can be divided at an appropriate position.

Furthermore, the projections 52 and 59 may be members separate from the front bracket 50 and the rear bracket 57 respectively. Moreover, the projections 52 and 59 may be formed from a single-sheet member instead of being bent into a projecting shape.

Furthermore, instead of the latches 53a and 47b engaging with the projections 52 and 59, there may be sheet-form members positioned a predetermined distance beneath the projections 52 and 59, and deformation of the projections 52 and 59 can be limited by their making contact with the sheet-like members.

Moreover, the present invention can be applied to the airbag 21 disposed in the front pillar 11.

Although embodiments of the present invention are explained in detail above, the present invention can be modified in a variety of ways without departing from the spirit and scope of the present invention.

What is claimed is:

1. An occupant restraint system comprising:
   an airbag for placement in a folded state along an upper edge of a door opening of a vehicle body; and
   an inflator that is adapted to generate a gas when the vehicle is involved in a collision, the gas inflating the airbag so that it is deployed into a curtain shape along an inner face of a side of an occupant compartment; and
   a gas supply pipe for routing gas from the inflator into the interior of the airbag in the event of a collision, the gas supply pipe having a first diameter;
   wherein
   the airbag comprises stitching defining a plurality of separate inflatable cells and a gas communication passage,
   the gas communication passage is formed from a part of said stitching so as to extend along the upper edge of the airbag, the gas communication passage having an inlet portion which receives said gas supply pipe therethrough and openings which communicate with the plurality of separate inflatable cells, and the gas communication passage having a second diameter significantly larger than said first diameter,
   a pipe support is formed from a part of said stitching at a longitudinally intermediate portion of said gas communication passage spaced apart from said inlet portion of said gas communication passage, including an upper pipe support portion extending significantly downwardly from the part of the stitching forming the gas communication passage and a lower pipe support portion extending significantly upwardly from the part of the stitching forming the gas communication passage so that the gas supply pipe is clamped between the upper and lower pipe support portions,
   a portion of the gas supply pipe is supported by the pipe support, and each of said cells includes an opening in communication with said gas supply pipe via the gas communication passage in said folded state of the airbag.

2. The occupant restraint system according to claim 1, wherein all said inflatable airbag cells are disposed below said gas supply pipe when said airbag is inflated and said pipe support is disposed at a longitudinally intermediate portion of said gas communication passage.

3. The occupant restraint system according to claim 1, further comprising a band disposed about a portion of said gas supply pipe at the inlet portion of said gas supply passage and securing the gas supply pipe to the airbag.

4. The occupant restraint system according to claim 1, comprising a plurality of said pipe supports disposed in a longitudinally spaced manner along said gas communication passage, and supporting longitudinally spaced portions of said gas supply pipe.

5. An occupant restraint system, comprising:
   an airbag for placement in a folded state along an upper edge of a door opening of a vehicle body; and
   an inflator that is adapted to generate a gas when the vehicle is involved in a collision, the gas inflating the airbag so that it is deployed into a curtain shape along an inner side face of an occupant compartment; and
   a gas supply pipe for routing gas from the inflator into the interior of the airbag in the event of a collision;
   wherein the airbag comprises a gas communication passage and a pipe support formed from stitching on the airbag, the gas communication passage formed from a part of said stitching so as to extend along the upper edge of the airbag, the gas communication passage having a diameter significantly larger than that of the gas supply pipe and an inlet portion receiving said gas supply pipe therethrough, the pipe support being spaced apart from said inlet portion of said gas communication passage and comprising an upper pipe support portion extending downward from an upper side of the part of the stitching forming the gas communication passage and a lower pipe support portion extending upward from the part of the stitching forming the wall of the gas communication passage so as to clamp the gas supply pipe therebetween, wherein a portion of the gas supply pipe is supported by the pipe support, the airbag includes a plurality of separate inflatable cells, and each of said cells includes an opening in communication with said gas supply pipe in said folded state of the airbag.

6. The occupant restraint system according to claim 5, wherein all said airbag cells are disposed below said gas supply pipe when said airbag is inflated.

7. The occupant restraint system according to claim 5, further comprising a band disposed about a portion of said gas supply pipe at the inlet portion of said gas supply passage and securing the gas supply pipe to the airbag.

8. The occupant restraint system according to claim 5, comprising a plurality of said pipe supports disposed in a longitudinally spaced manner along said gas communication passage, and supporting longitudinally spaced portions of said gas supply pipe.

* * * * *